(12) United States Patent
Garcia-Teijeiro et al.

(10) Patent No.: US 10,788,604 B2
(45) Date of Patent: Sep. 29, 2020

(54) FRACTURING AND REACTIVATED FRACTURE VOLUMES

(71) Applicant: Schlumberger Technology Corporation, Sugar Land, TX (US)

(72) Inventors: Xavier Garcia-Teijeiro, Berkshire (GB); Nikolaos Constantinos Koutsabeloulis, London (GB); Fabian Krzikalla, Gatwick (GB); Adrian Rodriguez-Herrera, Gatwick (GB); Andres Alfonso Pena Olarte, Gatwick (GB); James Minton, Gatwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 612 days.

(21) Appl. No.: 14/723,148

(22) Filed: May 27, 2015

(65) Prior Publication Data

US 2015/0377005 A1  Dec. 31, 2015

Related U.S. Application Data

(60) Provisional application No. 62/017,010, filed on Jun. 25, 2014.

(51) Int. Cl.
*G01V 99/00* (2009.01)
*G01V 11/00* (2006.01)
(Continued)

(52) U.S. Cl.
CPC ........ *G01V 99/005* (2013.01); *E21B 47/0224* (2020.05); *G01V 1/288* (2013.01);
(Continued)

(58) Field of Classification Search
CPC .... E21B 47/00; E21B 43/26; E21B 47/02208; E21B 47/0224; G01V 1/288;
(Continued)

(56) References Cited

U.S. PATENT DOCUMENTS

2009/0299637 A1* 12/2009 Dasgupta ............... G01V 1/008
702/12
2011/0257944 A1  10/2011 Du et al.
(Continued)

OTHER PUBLICATIONS

Warpinski, Norman R., et al. "Hydraulic-fracture geomechanics and microseismic-source mechanisms." SPE Journal 18.04 (2013). pp. 766-780.*
(Continued)

*Primary Examiner* — Kamini S Shah
*Assistant Examiner* — John E Johansen
(74) *Attorney, Agent, or Firm* — Michael Guthrie

(57) ABSTRACT

A method can include receiving mechanical information of a geologic environment and location information of natural fractures of the geologic environment; using a model of the geologic environment, calculating at least strain associated with hydraulic fracturing in the geologic environment; calculating at least microseismicity event locations based at least in part on the calculated strain; calibrating the model based at least in part on the calculated microseismicity event locations and based at least in part on measured microseismicity information associated with the geologic environment to provide a calibrated model; and, using the calibrated model, determining an increase in reactivated fracture volume associated with hydraulic fracturing in the geologic environment.

17 Claims, 16 Drawing Sheets

(51) Int. Cl.
E21B 43/00 (2006.01)
G01V 1/28 (2006.01)
E21B 47/0224 (2012.01)
E21B 47/00 (2012.01)

(52) U.S. Cl.
CPC .............. *G01V 11/00* (2013.01); *E21B 43/00* (2013.01); *E21B 47/00* (2013.01); *E21B 2200/20* (2020.05); *G01V 2210/123* (2013.01); *G01V 2210/66* (2013.01)

(58) Field of Classification Search
CPC ................. G01V 99/005; G01V 11/00; G01V 2210/123; G01V 2210/66; G06F 17/5009
USPC .......................................................... 703/10
See application file for complete search history.

(56) References Cited

U.S. PATENT DOCUMENTS

| 2012/0318500 | A1* | 12/2012 | Urbancic | ................ | E21B 43/26 166/250.1 |
| 2013/0238304 | A1 | 9/2013 | Glinsky | | |
| 2015/0066453 | A1* | 3/2015 | Bai | ...................... | G01V 99/005 703/2 |
| 2018/0217285 | A1* | 8/2018 | Walters | .................. | G01V 1/303 |

OTHER PUBLICATIONS

Dershowitz, W. S., et al. "A discrete fracture network approach for evaluation of hydraulic fracture stimulation of naturally fractured reservoirs." 44th US Rock Mechanics Symposium and 5th US-Canada Rock Mechanics Symposium. American Rock Mechanics Association. 2010. pp. 1-8.*

Cottrell et al. "Rapid discrete fracture analysis of hydraulic fracture development in naturally fractured reservoirs." Unconventional Resources Technology Conference. Society of Exploration Geophysicists, American Association of Petroleum Geologists, Society of Petroleum Engineers. pp. 1-13. (Year: 2013).*

Cottrell et al. "Rapid discrete fracture analysis of hydraulic fracture development in naturally fractured reservoirs.";Unconventional Resources Technology Conference. ;Society of Exploration Geophysicists, American Association of Petroleum Geologists, Society of Petroleum Engineers. pp. 1-13. (Year: 2015).*

Fischer, Tonnáš, and Alice Guest. "Shear and tensile earthquakes caused by fluid injection.";Geophysical Research Letters;38.5 (2011). pp. 1-4. (Year: 2011).*

Derode, et al., "Coupled seismo-hydromechanical monitoring of inelastic effects on injection-induced fracture permeability", Apr. 21, 2013, International Journal of Rocks Mechanics and Mining Sciences, vol. 61, pp. 266-274.

Maxwell, et al., "Passive seismic and surface monitoring of geomechanical deformation associated with steam injection", Sep. 1, 2008, The Leading Edge, pp. 1176-1184.

Herwanger, et al., "Seismic Geomechanics: How to Build and Calibrate Geomechanical Models using 3D and 4D Seismic Data", 2011, European Association of Geoscientists & Engineers, Houten, The Netherlands, 17 pages.

Mayerhofer, et al., "What is Stimulated Reservoir Volume?", Feb. 2010, SPE Production & Operations, pp. 89-98.

Nagel, et al., "Understanding SRV: A Numerical Investigation of Wet vs. Dry Microseismicity during Hydraulic Fracturing", Oct. 8-10, 2012, SPE Annual Technical Conference and Exhibition, San Antonio, TX, SPE 159791, 12 pages.

"Reservoir Simulation", Economides, 3rd Edition, Wiley, 2009, 64 pages.

Warpinski, et al., "Analysis and Prediction of Microseismicity Induced by Hydraulic Fracturing", Sep. 30-Oct. 3, 2001, SPE Annual Technical Conference and Exhibition, New Orleans, LA, SPE 71649, 13 pages.

Extended European Search Report issued in related EP application 15188313.9 dated Mar. 3, 2016, 9 pages.

Nagel, et al., "Stress Shadowing and Microseismic Events: A Numerical Evaluation," SPE Annual Technical Conference and Exhibition, Oct. 30-Nov. 2, Denver, Colorado, USA, 2011.

* cited by examiner

FRACTURING AND REACTIVATED FRACTURE VOLUMES

RELATED APPLICATION

This application claims the benefit of and priority to a U.S. provisional application having Ser. No. 62/017,010, filed 25 Jun. 2014, which is incorporated by reference herein.

BACKGROUND

Fracturing of a geologic environment can increase permeability of the geologic environment, which may help to increase production of a resource from the geologic environment.

SUMMARY

A method can include receiving mechanical information of a geologic environment and location information of natural fractures of the geologic environment; using a model of the geologic environment, calculating at least strain associated with hydraulic fracturing in the geologic environment; calculating at least microseismicity event locations based at least in part on the calculated strain; calibrating the model based at least in part on the calculated microseismicity event locations and based at least in part on measured microseismicity information associated with the geologic environment to provide a calibrated model; and, using the calibrated model, determining an increase in reactivated fracture volume associated with hydraulic fracturing in the geologic environment. A system can include a processor; memory operatively coupled to the processor; and one or more modules that include processor-executable instructions stored in the memory to instruct the system to receive mechanical information of a geologic environment and location information of natural fractures of the geologic environment; use a model of the geologic environment to calculate at least strain associated with hydraulic fracturing in the geologic environment; calculate at least microseismicity event locations based at least in part on the calculated strain; calibrate the model based at least in part on the calculated microseismicity event locations and based at least in part on measured microseismicity information associated with the geologic environment to provide a calibrated model; and use the calibrated model to determine an increase in reactivated fracture volume associated with hydraulic fracturing in the geologic environment. One or more computer-readable storage media can include computer-executable instructions to instruct a computer to: receive mechanical information of a geologic environment and location information of natural fractures of the geologic environment; use a model of the geologic environment to calculate at least strain associated with hydraulic fracturing in the geologic environment; calculate at least microseismicity event locations based at least in part on the calculated strain; calibrate the model based at least in part on the calculated microseismicity event locations and based at least in part on measured microseismicity information associated with the geologic environment to provide a calibrated model; and use the calibrated model to determine an increase in reactivated fracture volume associated with hydraulic fracturing in the geologic environment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
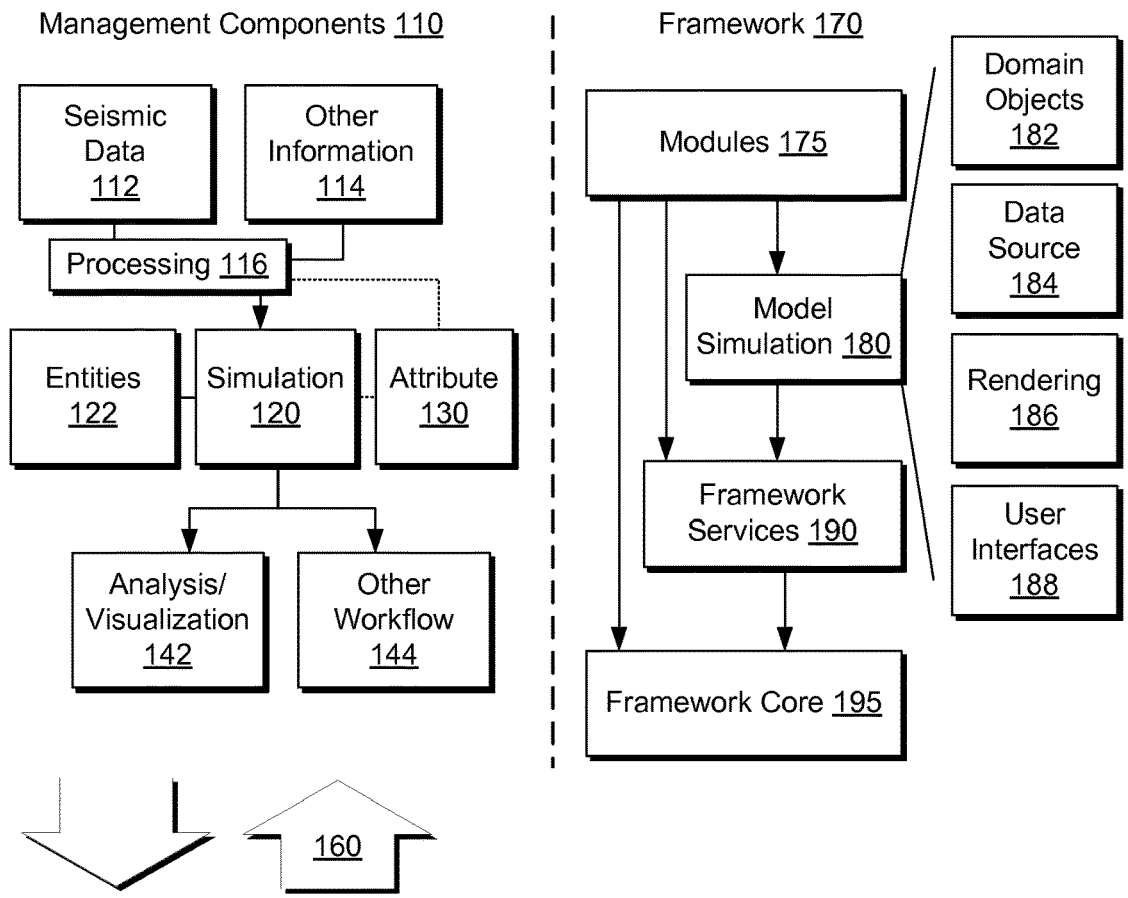
FIG. 1 illustrates an example system that includes various components for modeling a geologic environment and various equipment associated with the geologic environment.
Figure 1:
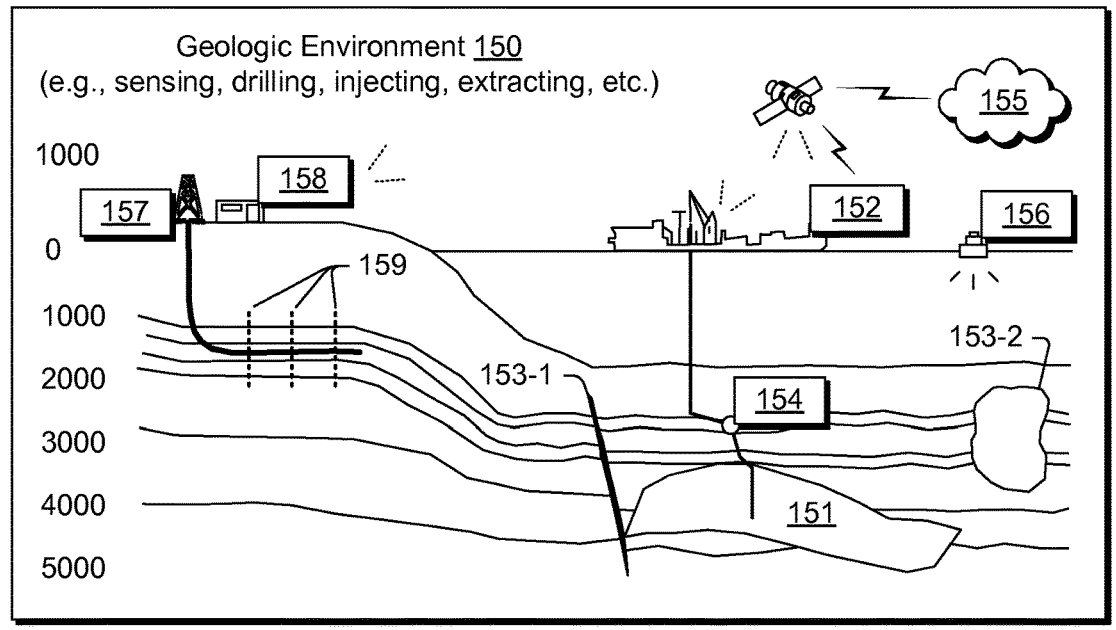

FIG. 1 shows an example of a system 100 that includes various management components 110 to manage various aspects of a geologic environment 150 (e.g., an environment that includes a sedimentary basin, a reservoir 151, one or more faults, 153-1, geobodies 153-2, fractures 159, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT™.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL™ seismic to simulation software framework (Schlumberger Limited, Houston, Tex.). The PETREL™ framework provides components that allow for optimization of exploration and development operations. The PETREL™ framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN™ framework environment (Schlumberger Limited, Houston, Tex.) allows for integration of add-ons (or plug-ins) into a PETREL™ framework workflow. The OCEAN™ framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN™ framework where the model simulation layer 180 is the commercially available PETREL™ model-centric software package that hosts OCEAN™ framework applications. In an example embodiment, the PETREL™ software may be considered a data-driven application. The PETREL™ software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include the reservoir 151 and one or more other features such as the fault 153-1, the geobody 153-2, the fractures 159, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with the one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows, which may include, for example, interacting with an environment, equipment in an environment, etc. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL™ software, for example, that operates on seismic data, seismic attribute(s), etc. As an example, a workflow may be a process implementable in the OCEAN™ framework. As an example, a workflow may include one or more worksteps that access a module such as a plug-in (e.g., external executable code, etc.).

Figure 2:
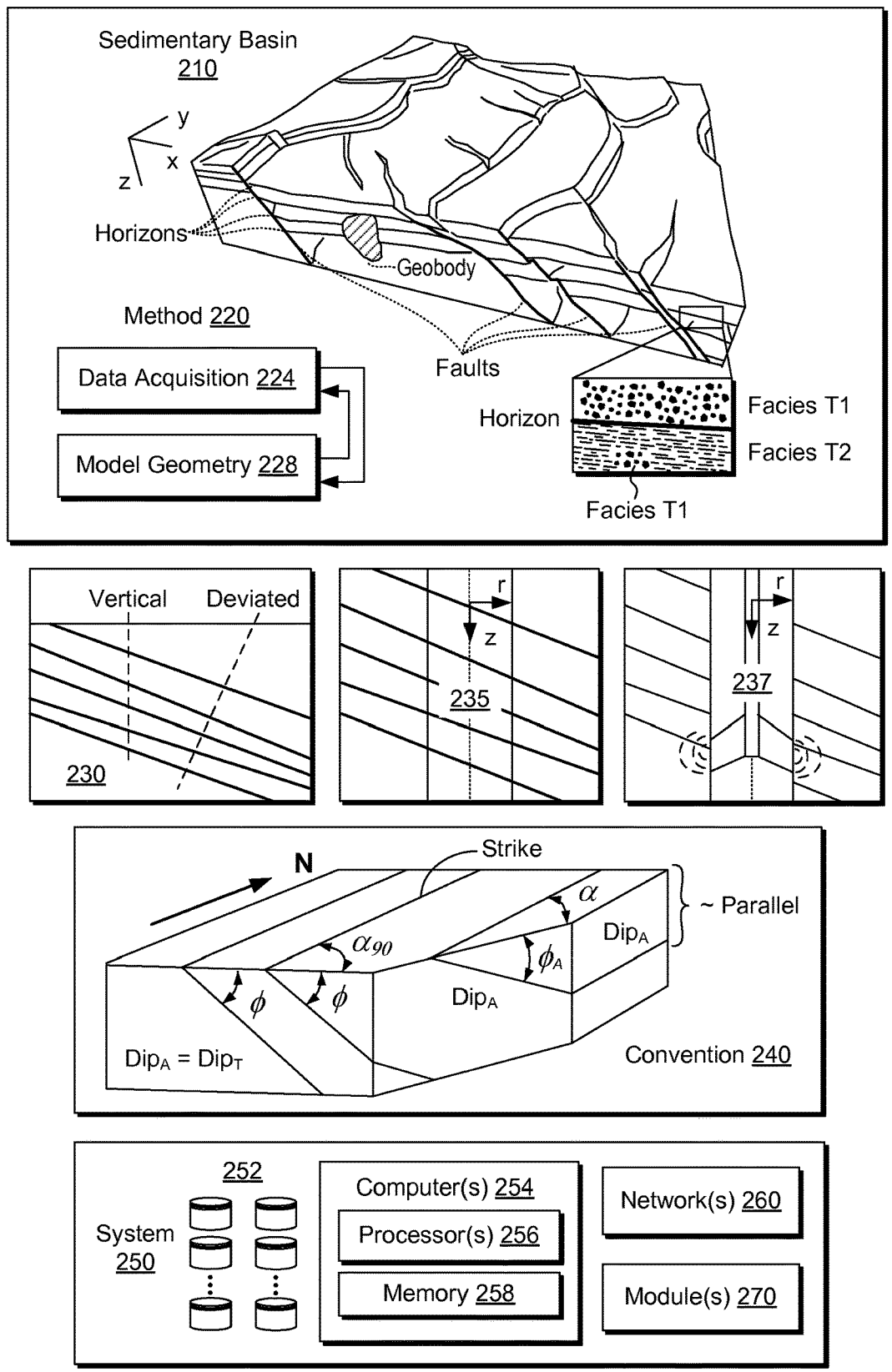
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD™ framework (Schlumberger Limited, Houston, Tex.) includes features for input of various types of information (e.g., seismic, well, geological, etc.) to model evolution of a sedimentary basin. The PETROMOD™ framework provides for petroleum systems modeling via input of various data such as seismic data, well data and other geological data, for example, to model evolution of a sedimentary basin. The PETROMOD™ framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL™ framework, workflows may be constructed to provide basin-to-prospect scale exploration solutions. Data exchange between frameworks can facilitate construction of models, analysis of data (e.g., PETROMOD™ framework data analyzed using PETREL™ framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore FORMATION MICROIMAGER™ (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG™ framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

Figure 3:
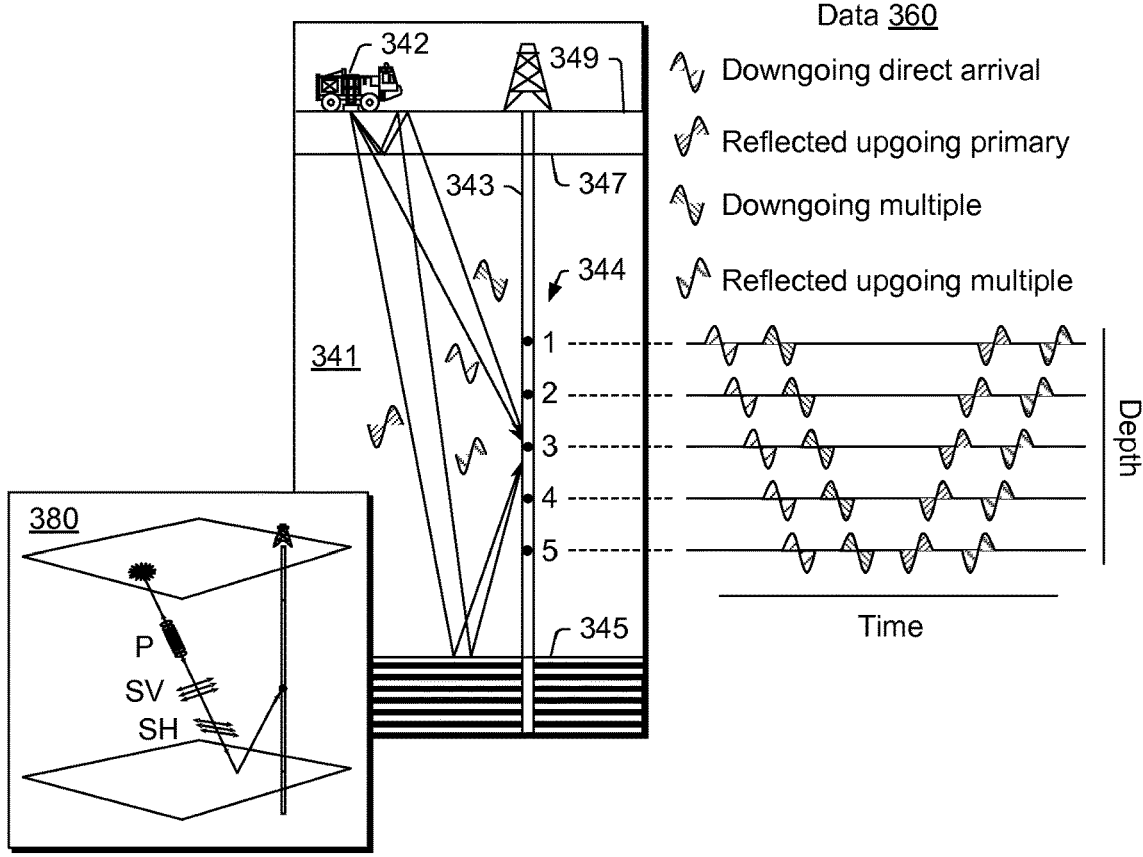
FIG. 3 illustrates an example of a technique that may acquire data.
Figure 3:
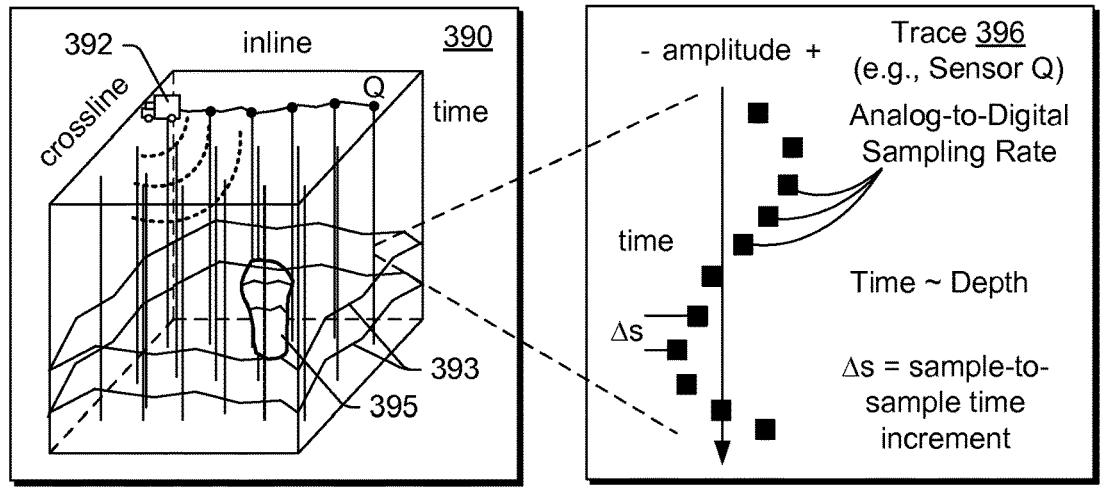

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\epsilon$, $\delta$ and $\gamma$. The Thomsen parameter $\delta$ describes depth mismatch between logs (e.g., actual depth) and seismic depth. As to the Thomsen parameter $\epsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters c and $\gamma$ may be estimated from wave data while estimation of the Thomsen parameter $\delta$ may involve access to additional information.

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Resource recovery from a geologic environment may benefit from application of one or more enhanced recovery techniques (e.g., consider an enhanced oil recovery (EOR) technique, etc.). For example, a geologic environment may be artificially fractured to increase flow of fluid from a reservoir to a well or wells. As an example, consider hydraulic fracturing where fluid pressure is applied to a subterranean environment to generate fractures that can act as flow channels. Hydraulic fracturing may be planned in advance, for example, to develop a region, which may be referred to as a drainage area. Hydraulic fracturing may be analyzed during or post-fracturing. As an example, hydraulic fracturing may occur in stages where a later stage may be planned at least in part based on information associated with one or more earlier stages.

Figure 4:
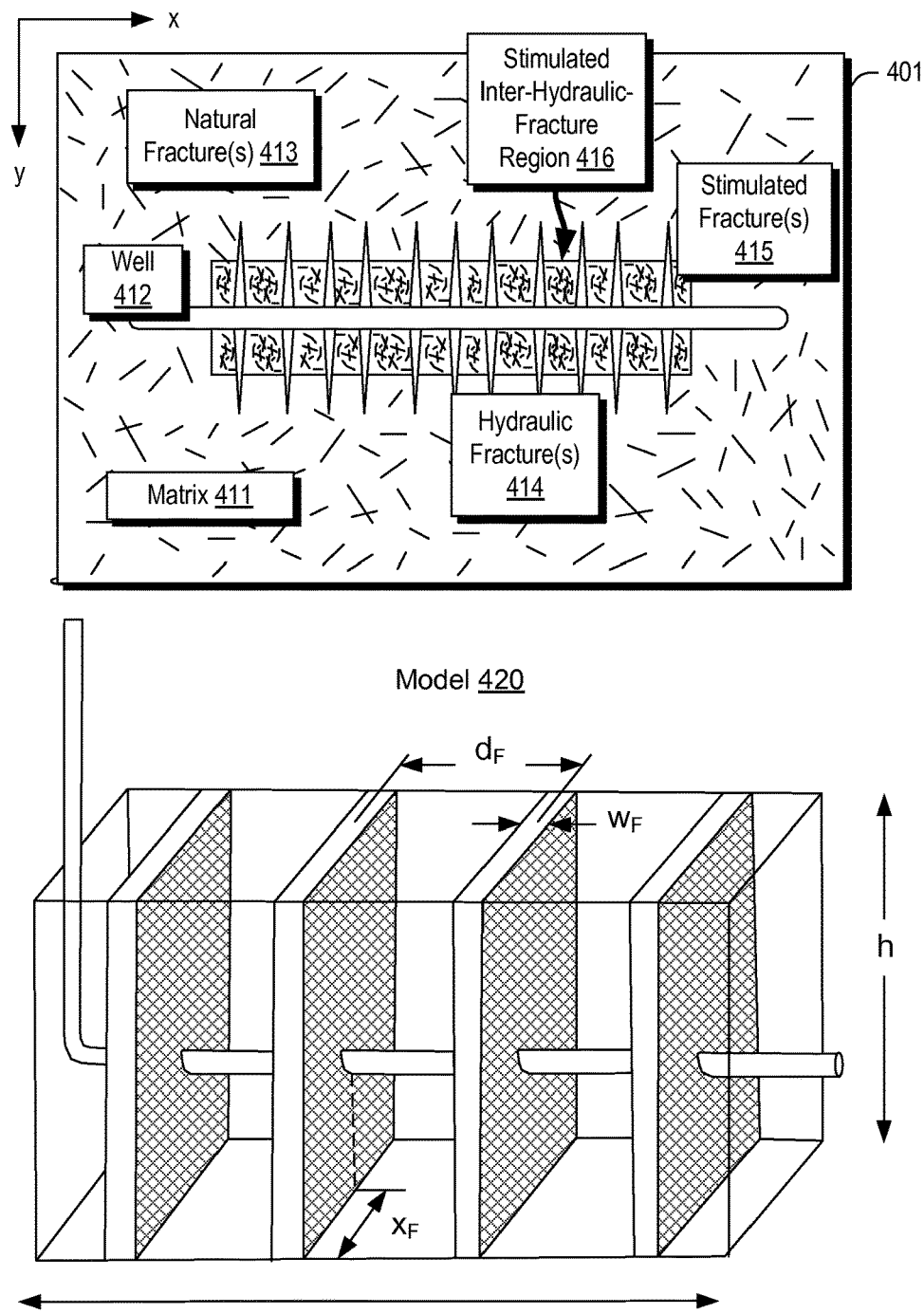
FIG. 4 illustrates an example of a model that includes fractures and an example of a method.

FIG. 4 shows an example of a model 401, a model 420 and a method 450. As shown, the model 401 can include constructs that model, for example, a matrix 411, a well 412, natural fractures 413, hydraulic fractures 414, stimulated fractures 415 and a stimulated inter-hydraulic fracture region 416. In the example of FIG. 4, the model 401 may encompass a drainage area, for example, defined as covering a surface area and as having a depth or depths. Given parameter values for the various constructs (e.g., locations, characteristics, etc.), the model 401 may be formulated with respect to a grid to form a numerical model suitable for providing solutions via a numerical solver.

In the example of FIG. 4, a three-dimensional grid with a well head for a well may extend along an axis where hydraulic fractures and other constructs may be modeled within the grid. As an example, by inputting the model and parameters into a numerical solver, results may be generated. For example, results may include pressure values that may be presented as contours with respect to a grid (e.g., consider pressure isobars where outer isobars are at higher pressures than an inner isobar, which may correspond to pressure in a horizontal wellbore). As mentioned, where pressure is higher in a matrix and fractures that intersect a wellbore than in the wellbore, fluid may flow from the matrix and fractures to the wellbore. As fluid is depleted from the matrix, pressure may drop and hence production may drop. The model 401 may be used to simulate production with respect to time, for example, for future times to estimate how depletion occurs and to estimate an ultimate recovery (e.g., EUR).

As an example, a model may implement a dual porosity approach (e.g., a continuum approach) for at least a portion of a formation (e.g., a drainage area). As an example, such a model may include one or more constructs for a shale gas formation.

Due to low stress anisotropy in shale gas formations, hydraulic fractures may be non-planar fractures that may develop a complex fracture network. Expansion of these non-planar hydraulic fractures may be represented in a model as a wide simulation cell that includes a relatively high permeability.

For a fracture system, natural fractures within a shale gas formation may also be considered. Such natural fractures may be found to be mineralized (e.g., calcite, etc.) or inactive. A model may include equations that provide for activation of such fractures, for example, responsive to hydraulic fracturing where microfractures are opened to provide for fluid flow. Such fractures may be considered as being stimulated fractures, for example, such fractures may be reactivated natural fractures (e.g., reactivated in response to an interventions such as hydraulic fracturing). As an example, a model may include four types of permeable media: matrix, natural fractures, stimulated fractures, and hydraulic fractures. As to a desorption process, a model may include equations that account for a Langmuir pressure and a Langmuir volume.

As to the model 420, it includes, as an example, a horizontal well intersected by multiple transverse vertical hydraulic fractures. Equations may be associated with the model 420 such as, for example, equations that depend on dimensions and properties of the vertical fractures. As an example, consider a trilinear model that includes equations for analysis of low-permeability (e.g., micro- and nano-Darcy range) fractured shale reservoirs according to three linear flow regions. Such a model may help to characterize a drainage area completed with one or more horizontal wells that intersect multiple transverse vertical fractures. Such a model may assist with planning and other aspects of field development, operations, etc.

As an example, a trilinear model can include a first region of idealized linear flow in a reservoir region within a length of fractures. Within the first region, linear flow may be assumed to exist in which fluid flow is normal to a plane of one or more vertical fractures. In such an example, reservoir volume may be defined by lengths of vertical fractures, formation thickness, number of vertical fractures, and spacing between adjacent fractures (e.g., consider a reservoir volume that may be referred to as a stimulated reservoir volume (SRV)). As an example, a second region in a trilinear model may be for idealized linear flow within a fracture and a third region may be for idealized linear flow in one or more reservoir regions beyond a length of vertical fracture(s). In low permeability reservoirs (e.g., such as fractured shale gas and oil reservoirs), contribution to production of a well from a reservoir region that lies beyond the SRV may be negligible in practice.

FIG. 4 also shows an example of a method 450 that includes a delivery block 454 for delivering fluid to a subterranean environment, a monitor block 458 for monitoring fluid pressure and a generation block 462 for generating fractures via fluid pressure. As an example, the generation block 462 may include activating one or more fractures. As an example, the generation block 462 may include generating and activating fractures. As an example, activation may occur with respect to a pre-existing feature such as a fault or a fracture. As an example, a pre-existing fracture network may be at least in part activated via a method that includes applying fluid pressure in a subterranean environment.

The method 450 may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.). As an example, a fracture may be defined as including "wings" that extend outwardly from a bore. Such wings may extend away from a bore in opposing directions, for example, according in part to natural stresses within a formation. As an example, proppant, such as grains of sand of a particular size, may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

As an example, in situ stresses can control orientation and propagation direction of hydraulic fractures, which tend to be tensile fractures that open in the direction of least resistance. As an example, if the maximum principal compressive stress is an overburden stress, then the fractures tend to be vertical, propagating parallel to the maximum horizontal stress when the fracturing pressure exceeds the minimum horizontal stress.

As the three principal stresses tend to increase with depth, the rate of increase with depth can define a vertical gradient. The principal vertical stress, referred to at times as overburden stress, is caused by the weight of rock overlying a measurement point. Its vertical gradient is known as the litho-static gradient. The minimum and maximum horizontal stresses are the other two principal stresses. Their vertical gradients, which may vary widely by basin and lithology, tend to be controlled by local and regional stresses, mainly through tectonics.

The weight of fluid above a measurement point in normally pressured basins creates in situ pore pressure. The vertical gradient of pore pressure is the hydrostatic gradient. However, pore pressures within a basin may be less than or greater than normal pressures and are designated as underpressured or overpressured, respectively.

Where fluid pressure is monitored (see, e.g., the monitor block 458 of the method 450), a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone.

Figure 5:
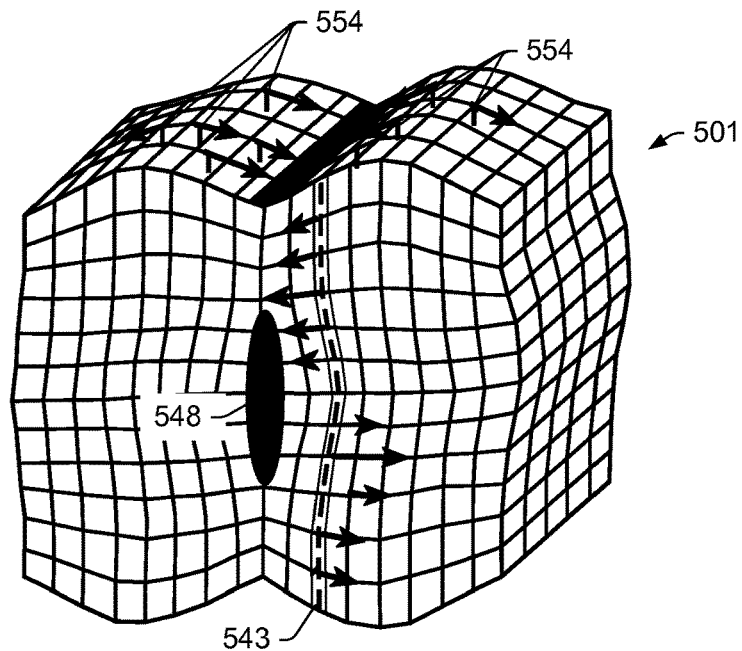
FIG. 5 illustrates an example of a fracture in a geologic environment and an example of a method.
Figure 5:
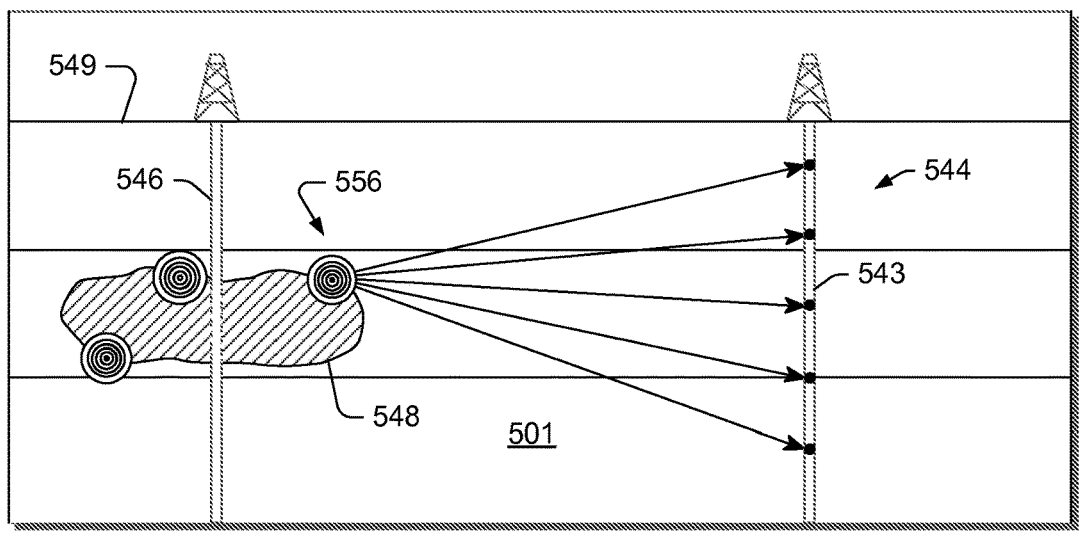
Figure 5:
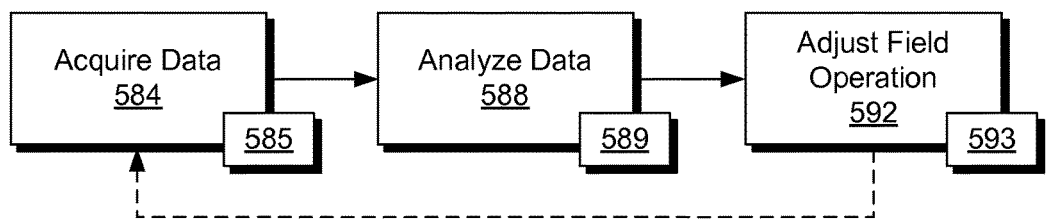

FIG. 5 shows an example of a geologic environment 501 in an approximate perspective view and in an approximate side view where the geologic environment includes a monitoring bore 543 with a sensor array 544, a treatment bore 546, a fracture 548, a surface 549 and surface sensors 554 (e.g., seismic sensors, tiltmeters, etc.). As an example, during growth of the fracture 548, energy may be emitted as a microseismic event 556. As shown, at least a portion of the energy associated with the microseismic event 556 may be detected at one or more sensors such as, for example, one or more sensors of the sensor array 544 and/or one or more of the surface sensors 554.

Where energy is sensed via the sensor array 544, such an approach may be referred to as a crosswell survey or crosswell technique. As illustrated in FIG. 5, the bore 546 may be an injection bore, for example, for injecting fluid, particles, chemicals, etc. germane to fracturing (e.g., a fracturing operation) and the bore 543 may be referred to as a monitoring bore (e.g., or a receiver or sensor bore).

As an example, tiltmeter information as to fracture-induced tilt or deformation may be acquired and analyzed and/or seismographic information as to microseismic energy may be acquired and analyzed. As an example, a map of deformation at a surface may allow for estimation of one or more of azimuth, dip, depth and width of a fracture. As an example, an acquisition system may be selected based in part on fracture depth. For example, microseismology may be implemented for monitoring where a fracture is expected to cause relatively little detectable surface tilt or deformation.

FIG. 5 also shows an example of a method 580 that includes an acquisition block 584 for acquiring data, an analysis block 588 for analyzing at least a portion of the acquired data and an adjustment block 592 for adjusting one or more field operations, for example, based at least in part on the analyzing. Such a method may include acquiring microseismic data, analyzing at least a portion of the microseismic data and optionally adjusting one or more field operations based at least in part on the analyzing. As an example, a method may include rendering to a display visual representations of information associated with one or more fractures, for example, to determine size, orientation, etc. of one or more fractures. As an example, a method may include rendering to a display visual representations of one or more events such as, for example, microseismic events (e.g., as to locations, magnitude, stage, etc.).

The method 580 may be associated with various computer-readable media (CRM) blocks or modules 585, 589 and 593. Such blocks or modules may include instructions suitable for execution by one or more processors (or processor cores) to instruct a computing device or system to perform one or more actions. As an example, a single medium may be configured with instructions to allow for, at least in part, performance of various actions of the method 580. As an example, a computer-readable medium (CRM) may be a computer-readable storage medium (e.g., a non-transitory medium that is not a carrier wave).

Figure 6:
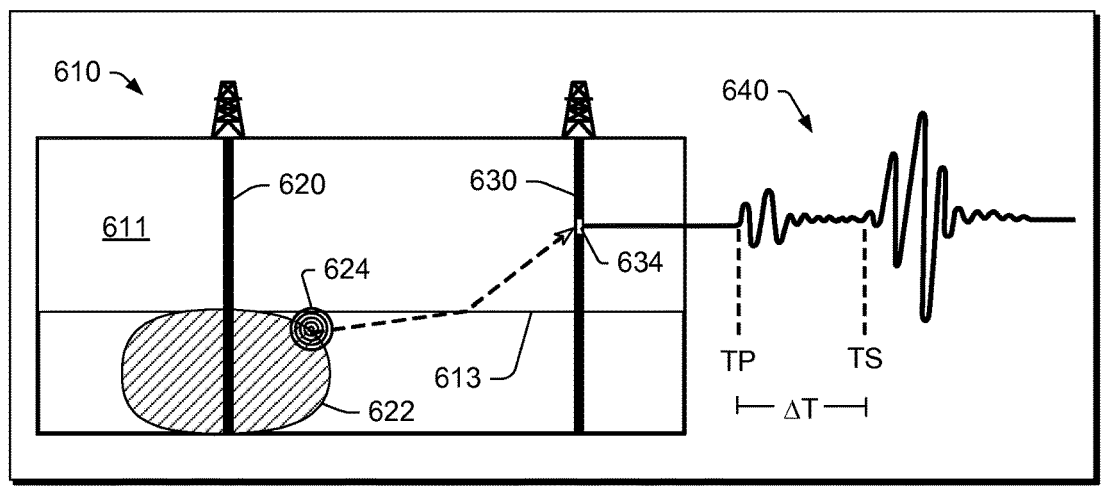
FIG. 6 illustrates examples of analysis techniques associated with microseismology.
Figure 6:
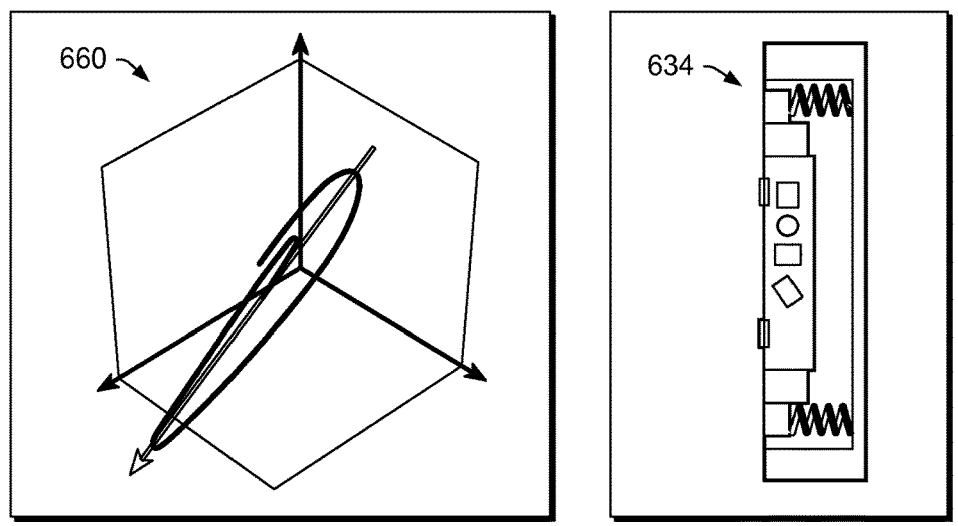
Figure 6:
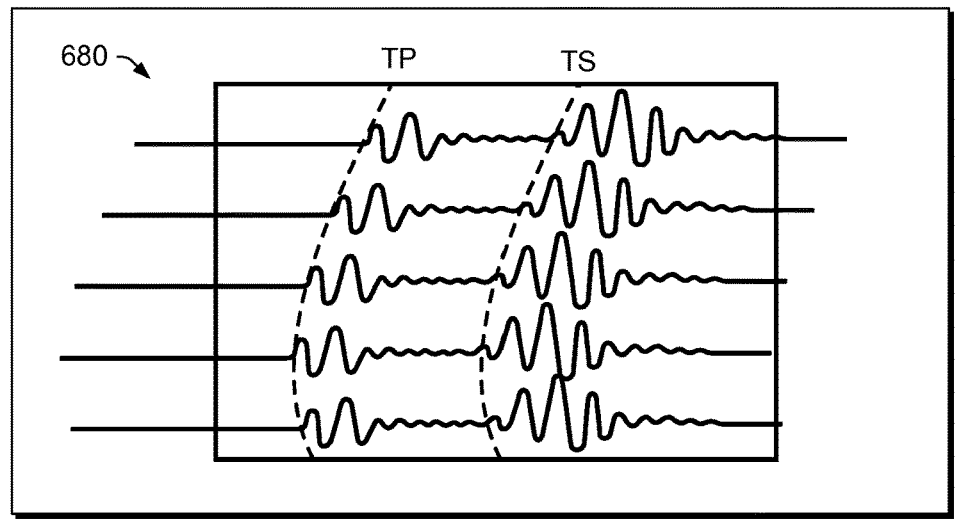

FIG. 6 shows an example of a microseismic survey 610, which may be considered to be a method that implements equipment for sensing elastic wave emissions of microseismic events (e.g., elastic wave energy emissions caused directly or indirectly by a treatment). As shown, the survey 610 is performed with respect to a geologic environment 611 that may include a reflector 613. The survey 610 includes an injection bore 620 and a monitoring bore 630. Fluid injected via the injection bore 620 generates a fracture 622 that is associated with microseismic events such as the event 624. As shown in the example of FIG. 6, energy of a microseismic event may travel through a portion of the geologic environment 611, optionally interacting with one or more reflectors 613, and pass to the monitoring bore 630 where at least a portion of the energy may be sensed via a sensing unit 634, which may include a shaker, three-component geophone accelerometers isolated from a sensing unit body (e.g., via springs, etc.), coupling contacts, etc. In the example of FIG. 6, the sensed energy includes compressional wave energy (P-wave) and shear wave energy (S-wave).

As an example, sensed energy may be analyzed, for example, to determine one or more of distance and azimuth from a sensor to a source of an elastic wave emission and depth of a source of an elastic wave emission (e.g., to determine location information, etc.). In a fracturing operation, a source of an elastic wave emission may be registered as an event, which can include a time, a location and one or more acquired signals (e.g., traces). As an example, information associated with an event may be analyzed to determine one or more of location and magnitude.

As an example, distance (d) to an event may be derived by measuring a time difference ($\Delta T$) between arrival times for a P-wave (TP) and an S-wave (TS). The value of the distance d may depend on use of a velocity model that characterizes velocity of elastic wave energy (e.g., elastic waves) with respect to depth. A velocity model may describe P-wave velocity and S-wave velocity with respect to depth (e.g., variation in material, pressures, etc. of a geologic environment).

As an example, azimuth to a microseismic event may be determined by analyzing particle motion of P-waves, for example, using hodograms. FIG. 6 shows an example of a hodogram 660 as a plot of sensed energy along at least two geophone axes as a function of time. A hodogram may be a graph or curve that displays time versus distance of motion. For example, a hodogram may be a crossplot of two components of particle motion over a time window. Hodograms may be part of a borehole seismologic survey where they may be used to determine arrival directions of waves and to detect shear-wave splitting.

As to determination of depth of a microseismic event, as illustrated in a plot 680, P-wave and S-wave arrival delays between sensors, or moveout, at the monitoring bore 630 may be analyzed.

Microseismicity recorded during multistage fracture treatments may provide disperse "clouds" of events (e.g., located at individual event hypocenters). As an example, a method can include analyzing clouds of events to extract planar-type features, which may be indicative of fracture location, directions of stresses, etc.

Effectiveness of hydro-fracturing, as a stimulation method, can depend on multiple variables and competing effects. For instance, a hydraulic fracture, or stage-fracture, may be expected to propagate deeply into a pay zone and increase surface area through which hydrocarbons can be drained from a formation to a well. As to predicting behavior, for example, via modeling, various variables (e.g., local stress, natural fracture network, injection rate, fluid viscosity, etc.) can act together to determine the size, orientation, aperture and geometry of the resulting stage-fracture values, for such variables may be not be known a priori, may be known with some uncertainty, etc.

During creation or propagation, a hydraulic fracture introduces changes in a stress field around it. For example, an increase in the minimum horizontal stress, $S_{hmin}$ (e.g., "stress shadow effect"), can affect pressure needed to open a fracture (e.g., a subsequent fracture) and its shape, thus potentially affecting in a negative way effectiveness of a hydraulic-fracturing job. On the other hand, these stress changes may also "reactivate" pre-existing natural fractures thorough phenomena such as shearing and dilatation, which potentially could have a positive effect of increasing permeability within a Stimulated Rock Volume (SRV). As an example, a stimulation process may reactivate a number of natural fractures to increase permeability within a region of interest, which may be, post-stimulation, a SRV. As an example, a natural fracture may be considered to be active at some time or times during its existence and may be considered to be reactivated in response to an intervention such as a stimulation treatment (e.g., hydraulic fracturing, etc.).

Stress shadows, microseismicity, stimulated rock volume and production tend to be related in a complex manner. It may be desirable to understand better such processes, for example, to help predict magnitude and consequences of a stress shadow and SRV. As an example, a method may include establishing one or more linkages between fracture geometry, microseismicity, stress shadow, SRV and permeability.

As an example, a method can include defining total reactivated fracture volume (RFV) in a manner where it may be estimated by calculations based at least in part on an elasto-plastic solution to a problem of opening and shearing of one or more fractures under given stress conditions. Such an approach can establish one or more links between factors such as, for example, dynamic stress changes, microseismic activity, effective changes in fracture aperture, and permeability. As an example, a method may be a workflow that may include worksteps. As an example, a method can include receiving input information from a multidimensional mechanical earth model (e.g., consider a 3D MEM) and receiving input information as to fracture geometry (e.g., consider geometry of a discrete fracture network (DFN)). In such an example, the method may be formulated numerically where one or more numerical techniques may be applied to solve equations for output values (e.g., results). As an example, starting from a 3D MEM and guidelines on fracture geometry, a numerical solution may be output for permeability enhancements, microseismicity and RFV.

Figure 7:
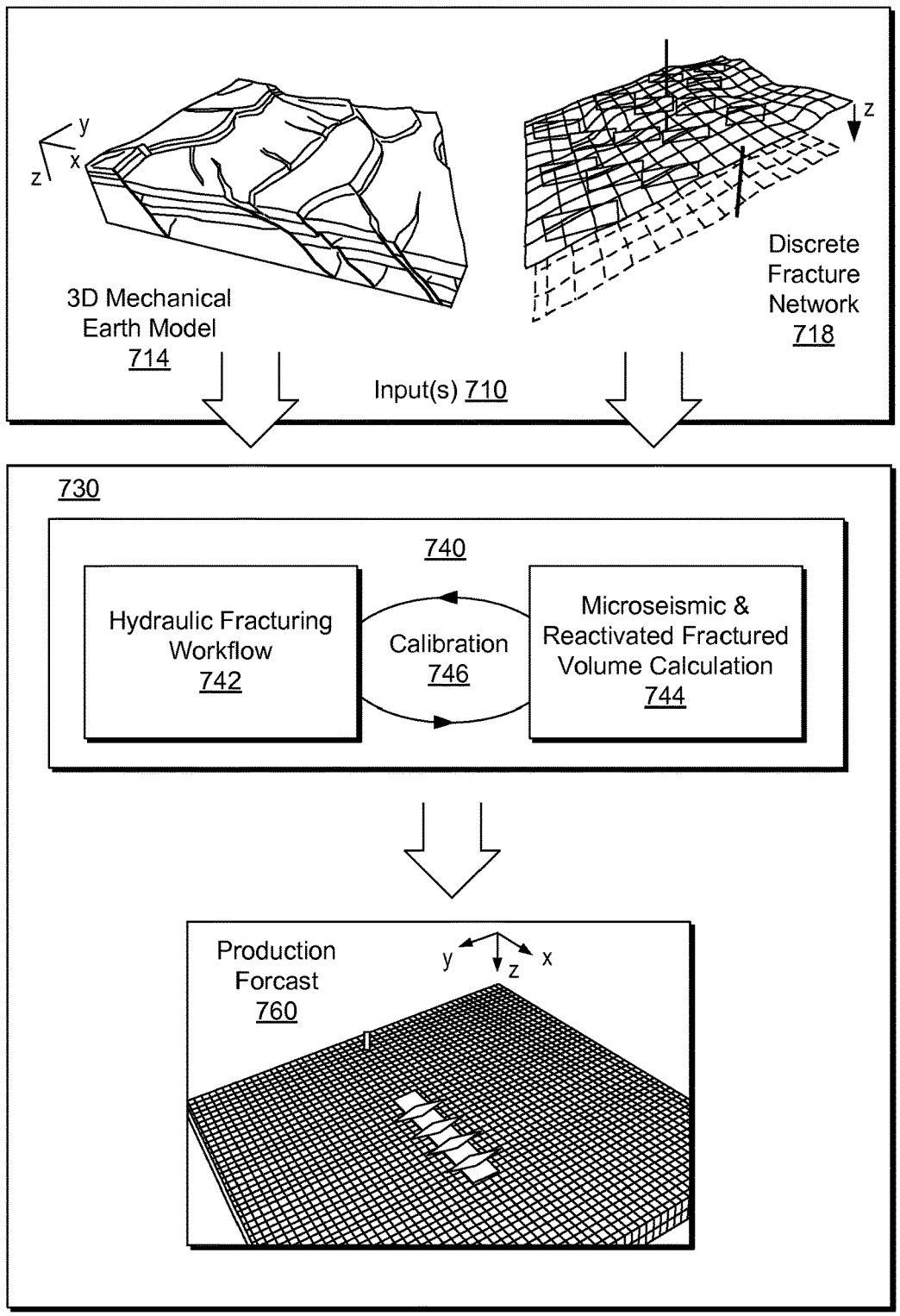
FIG. 7 illustrates an example of a method.

FIG. 7 shows an example of a method 700 that may be a workflow. As shown, the method 700 includes an input block 710 for inputting information such as information associated with a 3D MEM 714 and a DFN 718 and a calculation block 730 for calculating a production forecast 760, for example, based on a process of a process block 740 that includes a hydraulic fracturing workflow block 742 and a microseismic and reactivated fractured volume calculation block 744 where a calibration 746 interacts with the blocks 742 and 744. For example, the process block 740 can include iteratively calibrating, per the calibration block 744, one or more aspects of hydraulic fracturing per the block 742 and one or more aspects of microseismic and RFV calculations per the block 744. Such calibrating may act to reduce error of one or more variables (e.g., via minimization, etc.) such that the calculation block 730 can output the production forecast 760. As shown, the production forecast 760 may be output as values that can be represented with respect to a model of a geologic environment. As an example, a production forecast may include values over a drainage area that includes a stress shadow region. For example, production forecast values (e.g., pressure, etc.) may be defined within a region that may be bound at least in part by a stress shadow region. As an example, a production forecast may be associated with one or more bores such as a substantially horizontal bore that is in fluid communication with one or more hydraulic fractures that may be substantially vertical (see, e.g., the model 420 of FIG. 4). As an example, a production forecast may be based at least in part on output from a reservoir simulator (e.g., consider the ECLIPSE™ simulator, etc.). As an example, at least a portion of information of the process block 740 may be input to a reservoir simulator, for example, to perform calculations that may be germane to the production forecast 760.

As an example, a method can take, as input, information from a 3D MEM and information from a model of natural fractures (e.g., consider a DFN model) that can include geometry and locations of natural fractures. Such a method can be formulated into a portion that models hydraulic fracturing creation and associated stress/strain changes and into a portion that computes microseismicity and RFV at least in part on modeled stresses/strains. In such an example, the modeled stresses/strains may include stresses/strains based at least in part on changes thereto that result from fracturing. As an example, predicted microseismicty can be compared with available field data for the purpose of calibration until an acceptable match is obtained (e.g., after changing input parameters). As an example, results obtained for a RFV may be used to compute permeability (e.g., permeability changes) that may be used to provide one or more production forecasts (e.g., via a reservoir simulator, etc.).

Figure 8:
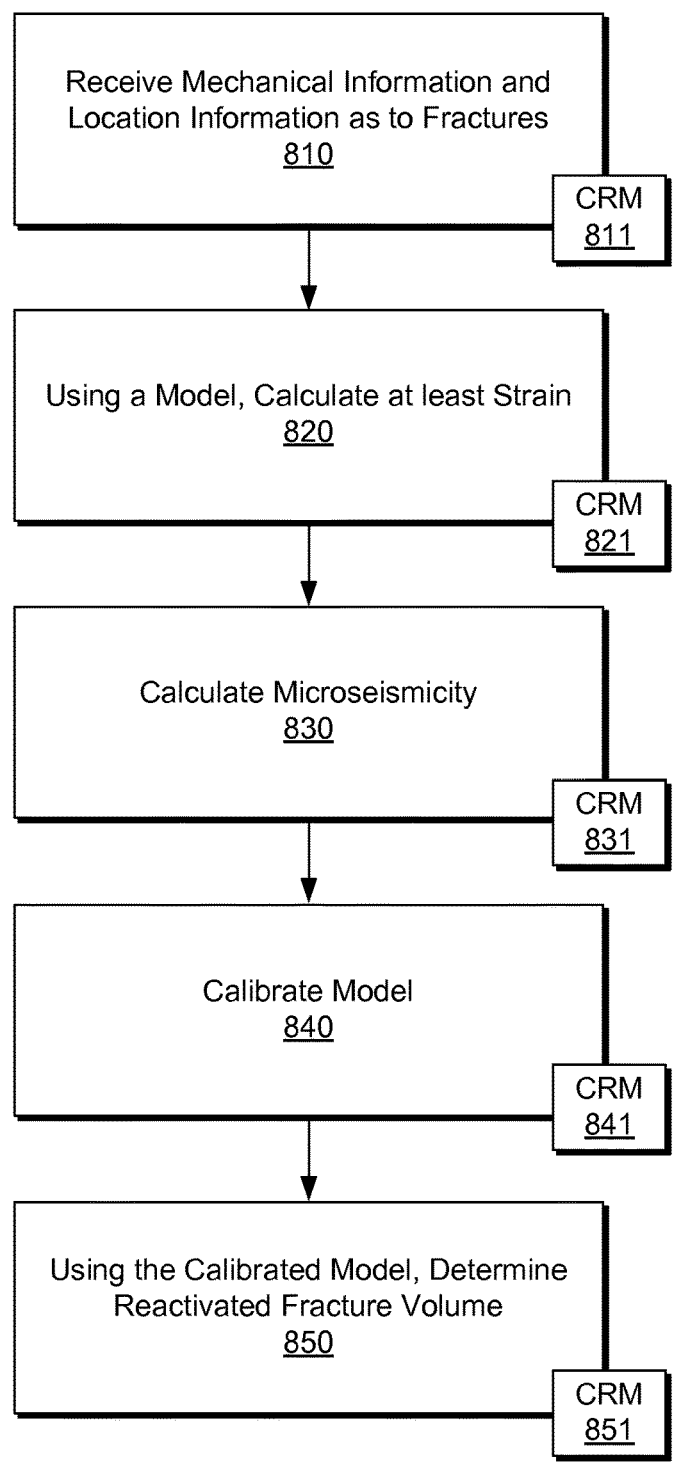
FIG. 8 illustrates an example of a method.

FIG. 8 shows an example of a method 800 that includes a reception block 810 for receiving mechanical information of a geologic environment and location information of natural fractures of the geologic environment; a calculation block 820 for, using a model of the geologic environment, calculating at least strain associated with hydraulic fracturing in the geologic environment; a calculation block 830 for calculating at least microseismicity event locations based at least in part on the calculated strain; a calibration block 840 for calibrating the model based at least in part on the calculated microseismicity event locations and based at least in part on measured microseismicity information associated with the geologic environment to provide a calibrated model; and a determination block 850 for, using the calibrated model, determining an increase in reactivated fracture volume associated with hydraulic fracturing in the geologic environment.

The method 800 may be associated with various computer-readable media (CRM) blocks or modules 811, 821, 831, 841 and 851. Such blocks or modules may include instructions suitable for execution by one or more processors (or processor cores) to instruct a computing device or system to perform one or more actions. As an example, a single medium may be configured with instructions to allow for, at least in part, performance of various actions of the method 800. As an example, a computer-readable medium (CRM) may be a computer-readable storage medium (e.g., a non-transitory medium that is not a carrier wave).

As an example, a model may consider a geologic environment as a homogenous medium. As an example, a stability function may be formulated that depends on maximum effective principal stress ($\sigma_1$), minimum effective principal stress ($\sigma_3$) and a material friction angle ($\phi$). For example, consider the following equation:

$$f_s = \sigma_1 - \sigma_3 \frac{1+\sin(\phi)}{1-\sin(\phi)}$$

As an example, a perturbation of a stress field introduced by opening of a hydraulic fracture may be quantified via changes in stability function (e.g., per the foregoing equation).

As an example, a stability function can provide a measure of the likelihood of failure of discontinuities optimally oriented to slide under given stress conditions. For example, negative changes of the stability function $\Delta f_s < 0$ result from changes in stress magnitude into a state for which discontinuities are more stable; and positive changes, $\Delta f_s > 0$, denote the evolution into a stress state for which various oriented discontinuities are closer to failure (e.g., discontinuities optimally oriented, near optimally oriented, etc.).

Figure 9:
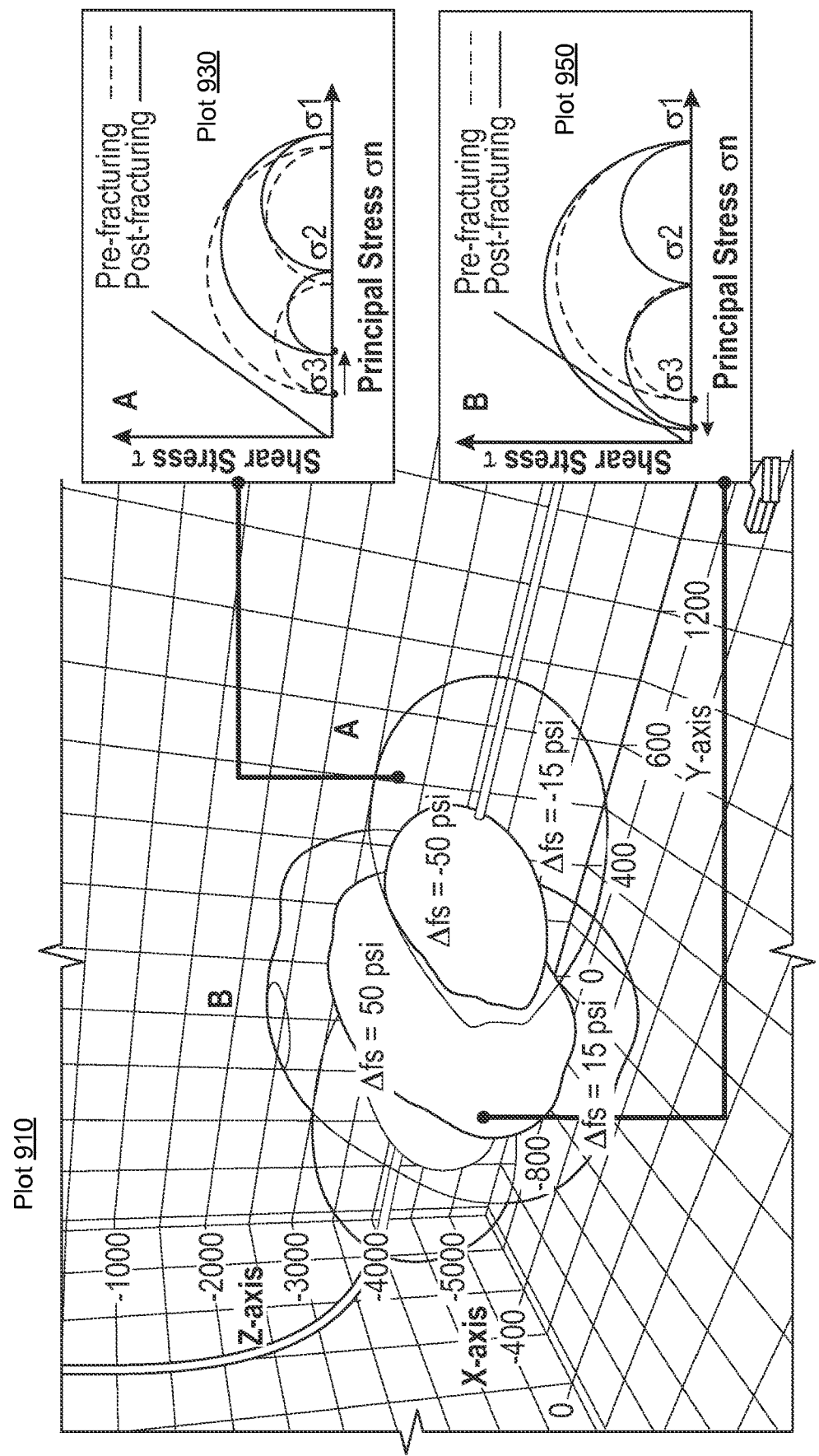
FIG. 9 illustrates example plots.

FIG. 9 shows examples of plots 910, 930 and 950. The plot 910 illustrates three-dimensional stress change in a neighborhood of a hydraulic fracture in a model where the hydraulic fracture is made within a model of a homogeneous medium. The plot 910 includes examples of values of $\Delta f_s$ (e.g., in psi) some of which are less than zero and some of which are greater than zero. The plots 930 and 950 include Mohr's circles, two-dimensional graphical representations of the transformation law for the Cauchy stress tensor. In the plots 930 and 950 the abscissa ($\sigma$) and ordinate ($\tau$) of each point on a circle are the magnitudes of the normal stress and shear stress components, respectively (e.g., acting on the rotated coordinate system). Thus, a circle is the locus of points that represent the state of stress on individual planes at their orientations, where the axes represent the principal axes of the stress element. The plots 930 and 950 show examples for pre-fracturing and post-fracturing as associated with regions corresponding to A and B, respectively, in the plot 910. As indicated in the plots 930 and 950 shifts may occur, for example, for the region A (e.g., region ahead of a hydraulic fracture), the plot 930 shows a positive shift in $\sigma_3$ (e.g., the minimum principal effective stress component) while, for the region B (e.g., region near tip of a main hydraulic fracture), the plot 950 shows a negative shift for $\sigma_3$. The plots 930 and 950 also show $\sigma_1$ (e.g., the maximum principal effective stress component); noting an increase in Region A post-fracturing, as shown in the plot 930.

As shown in the plot 910, induced stress changes are three-dimensional where, for example, $\Delta f_s$ can be negative inside a volume in front of the fracture plane and positive inside a volume that extends above and below the hydraulic fracture from its edges. As an example, reactivation of natural fractures can depend on such stress changes and on orientation of fractures and initial stress state.

Figure 10:
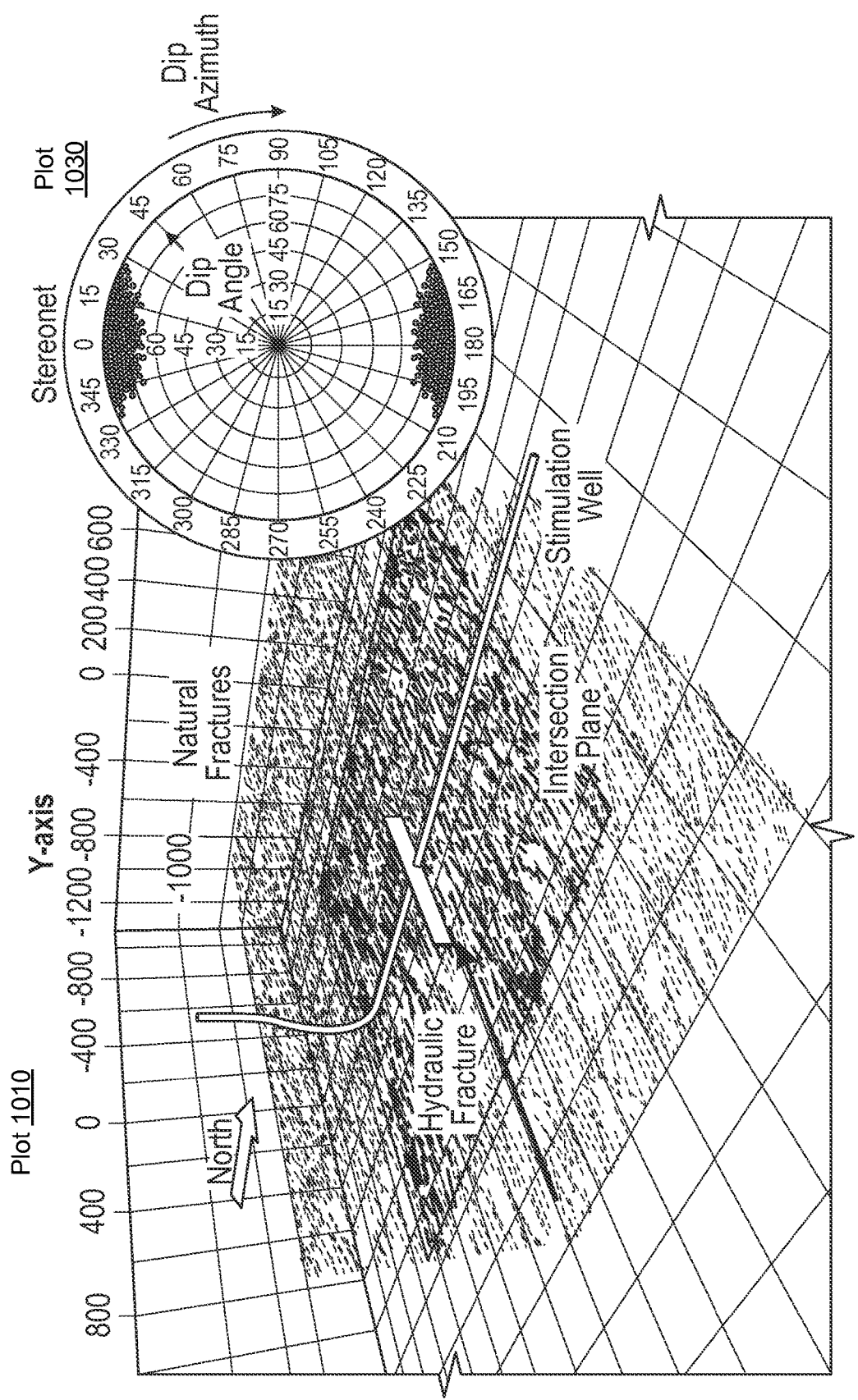
FIG. 10 illustrates example plots.

FIG. 10 shows example plots 1010 and 1030 associated with an example of a model of fractured rock. In the example model, natural fractures are planar and distributed within the simulation volume. In FIG. 10, the plot 1010 shows a hydraulic fracture as associated with a stimulation well while the plot 1030 is a stereonet plot that depicts points representing individual fracture orientations. As shown in the plot 1030, the distance from a point to a center of a circle indicates dip angle of a represented fracture, from zero at the center of the plot 1030 to 90 degrees at the edge. Individual natural fractures may be modeled, for example, as a planar rectangle (e.g., a polygon). As an example, length may be sampled from a distribution, for example, consider a power-law distribution.

Figure 11:
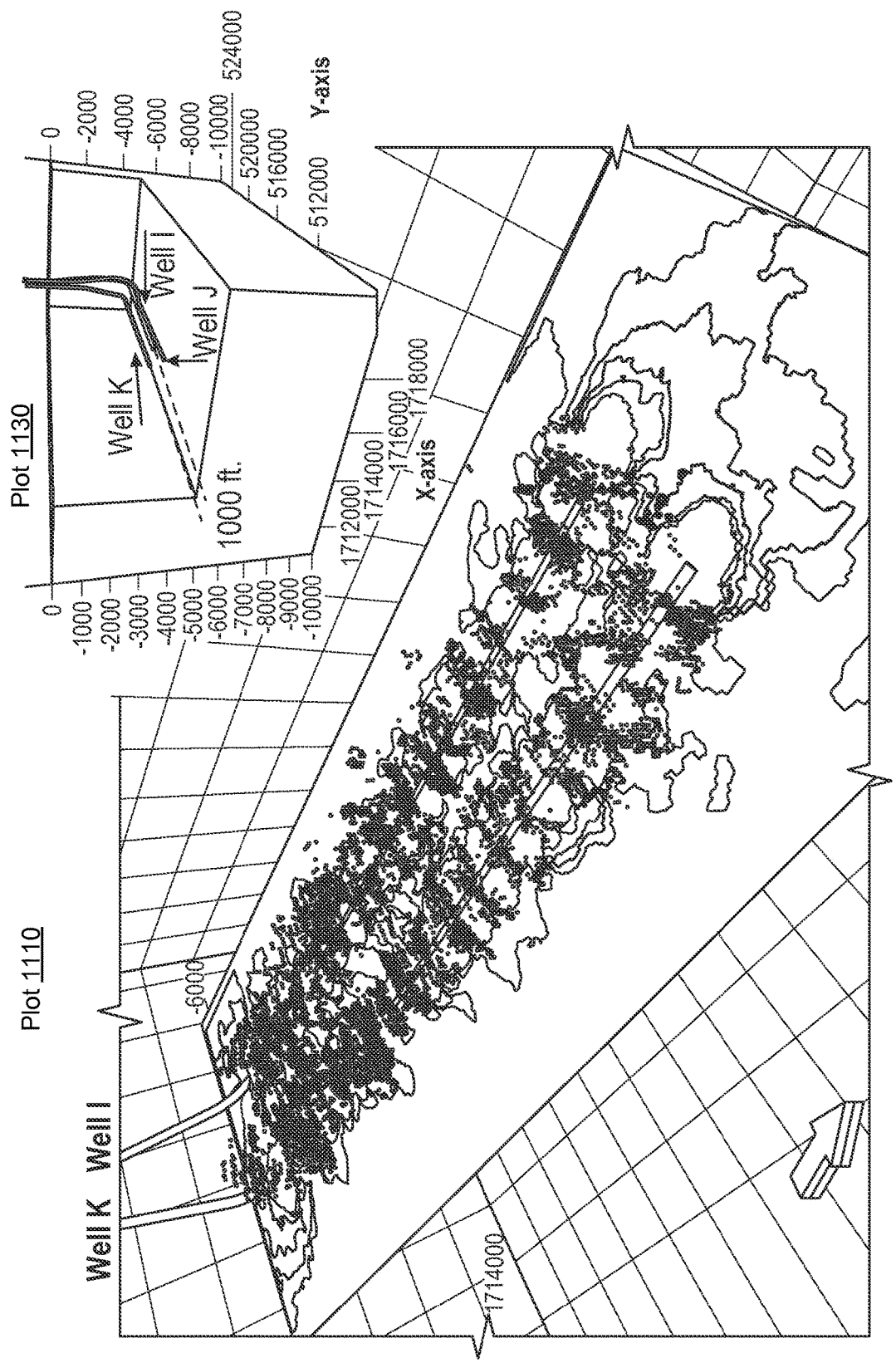
FIG. 11 illustrates example plots.

FIG. 11 shows example plots 1110 and 1130 for a geologic environment that includes Well I, Well J and Well K, which may be, for example, wells scheduled for stimulation to reactivate natural fractures (e.g., via a hydraulic fracturing). The plot 1110 shows stress perturbations around a set of interfering hydraulic fractures. The plot 1110 shows change in the minimum principal stress due to opening of hydraulic fractures and associated micro-seismicity (e.g., as calculated).

Figure 12:
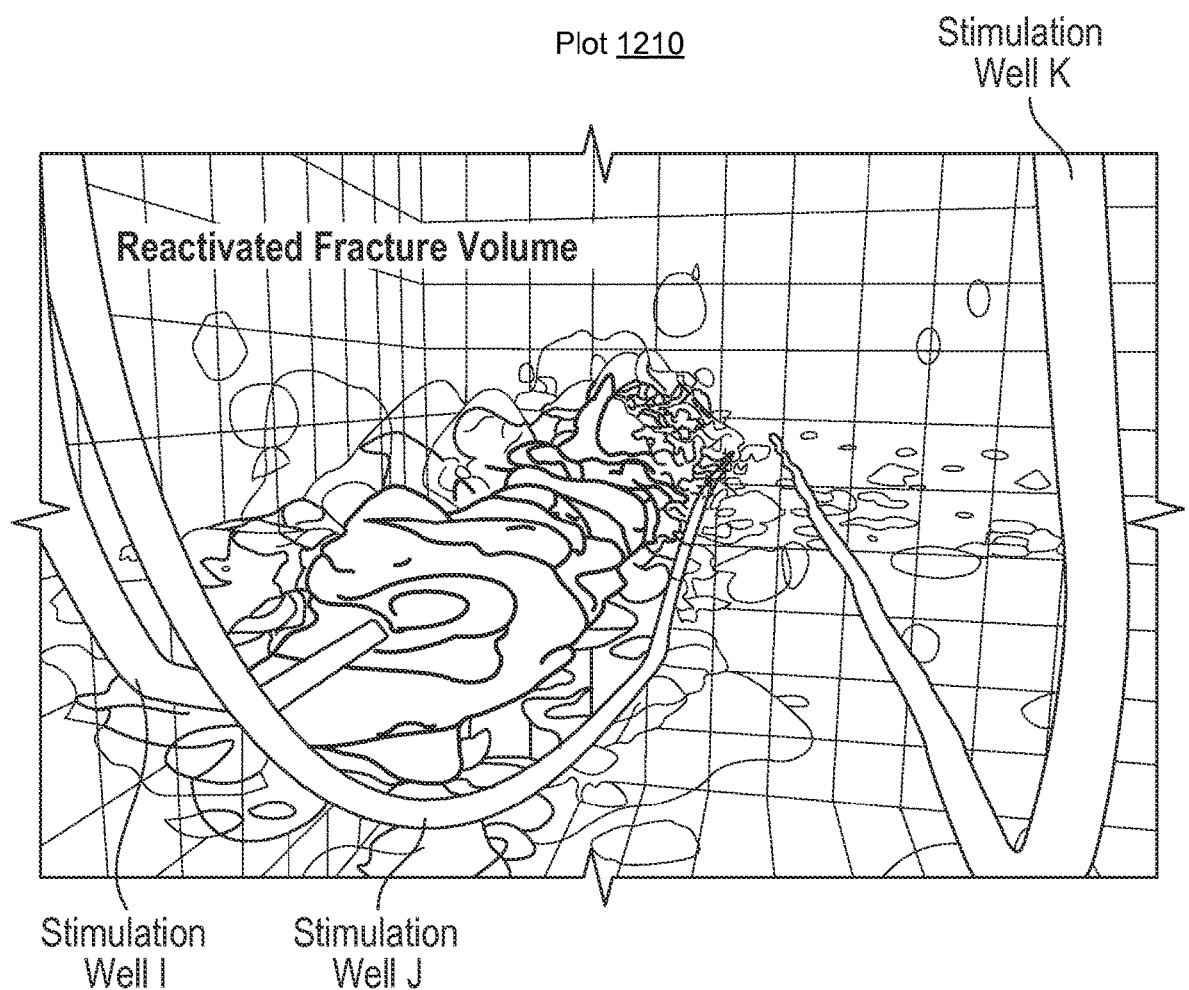
FIG. 12 illustrates an example of a plot.

FIG. 12 shows a plot 1210 of isosurfaces of aperture changes in reactivated natural fractures. The plot 1210 shows Well I, Well J and Well K, for example, as illustrated in the plot 1110 of FIG. 11. The contours in the plot 1210 are from a simulation and indicate predicted aperture changes of reactivated fractures after stimulation of Well I. As shown, the change in aperture of each of the reactivated fractures was obtained from the plastic shear deformation and the dilation angle (e.g., assumed to be about 10 degrees). As an example, total new volume created due to opening of reactivated fractures may be defined as "Total Reactivated Fracture Volume" (e.g., total RFV). As an example, a sub-volume of the total RFV that results from reactivated fractures, that are connected to the stages in the well either directly or through other reactivated fractures may be referred to as "Interconnected Fracture Volume" (e.g., IFV). As an example, a method may include calculating RFV and IFV for a region. In such an example, RFV and IFV may be analyzed, optionally in conjunction with microseismicity; noting that stress-induced changes due to fracturing may reactivate a substantial number of fractures whether or not such reactivation is detected as microseismicity.

As an example, a method can include determining a volume associated with reactivation of natural fractures connected, directly and/or indirectly, to a stimulation well or wells. As an example, a method can include rendering a representation of a volume associated with reactivation of natural fractures to a display. As an example, such a representation may be rendered along with representations of one or more wells, stress (e.g., stress contours, etc.), one or more surfaces, etc. As an example, where fracturing occurs in stages, a method may include accounting for a stage-by-stage parameters. For example, a stage may be modeled via a computational model and then the stage may be performed based at least in part on the computational model (e.g., model results). A computational model may then be revised (e.g., updated) to account for the already performed stage and to model another stage. For example, a model may include information for a prior stage and may include information for generation of a future stage.

Figure 13:
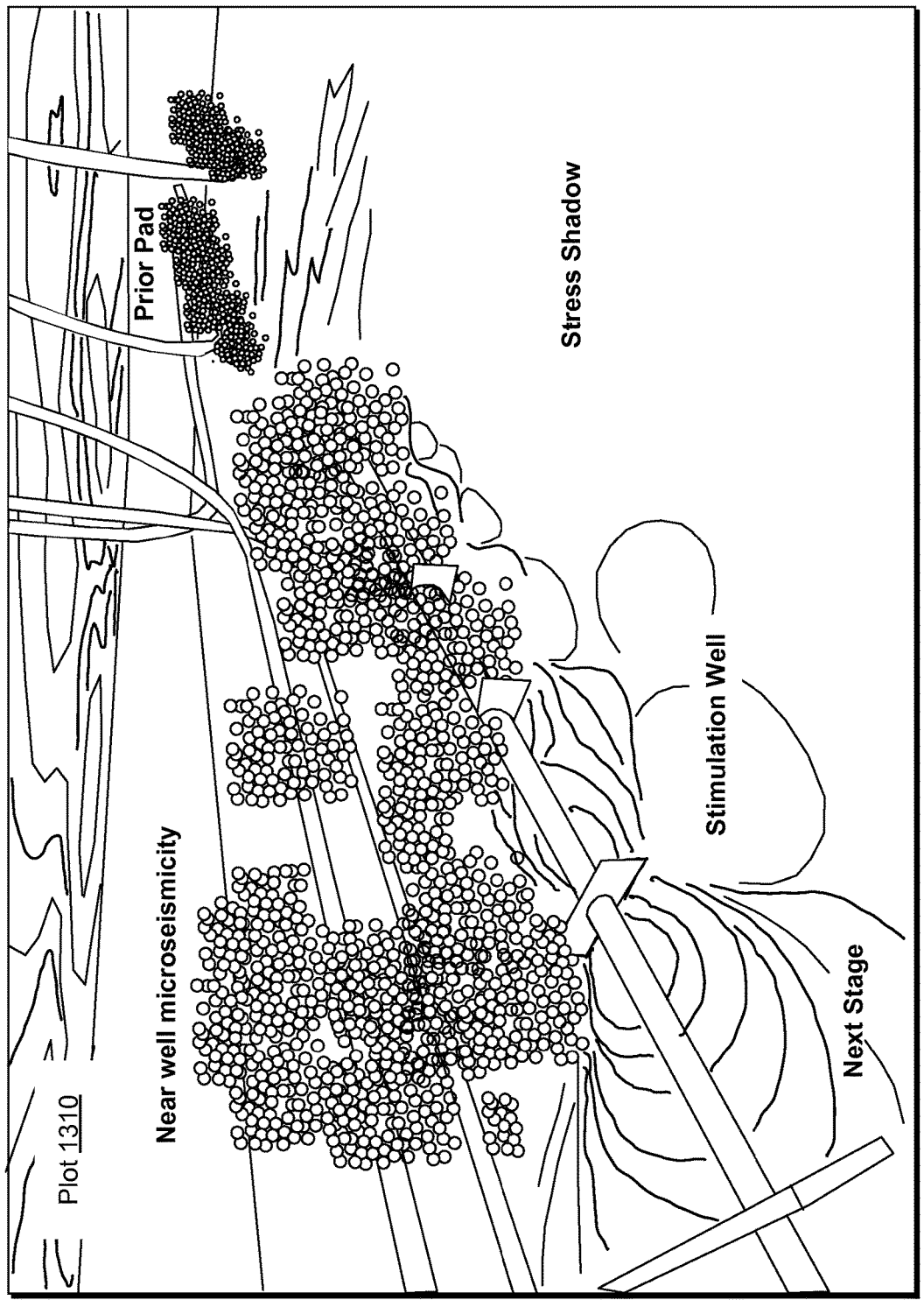
FIG. 13 illustrates an example of a plot.

FIG. 13 shows an example of a visualization of a model for modeling a geologic environment. The visualization of FIG. 13 may be a graphical user interface that can be rendered to a display of a computing system, for example, via execution of instructions by one or more processors where information may be provided as to locations of wells, microseismic events, etc. The visualization of FIG. 13 shows new well microseismicity (e.g., computed synthetic seismicitiy), a stress shadow region, a prior pad with wells and associated fractures and microseismicity and a "next stage" representation of a fracture that may be planned for creation in a stage of a fracturing process applied to the geologic environment represented by the visualization.

Figure 14:
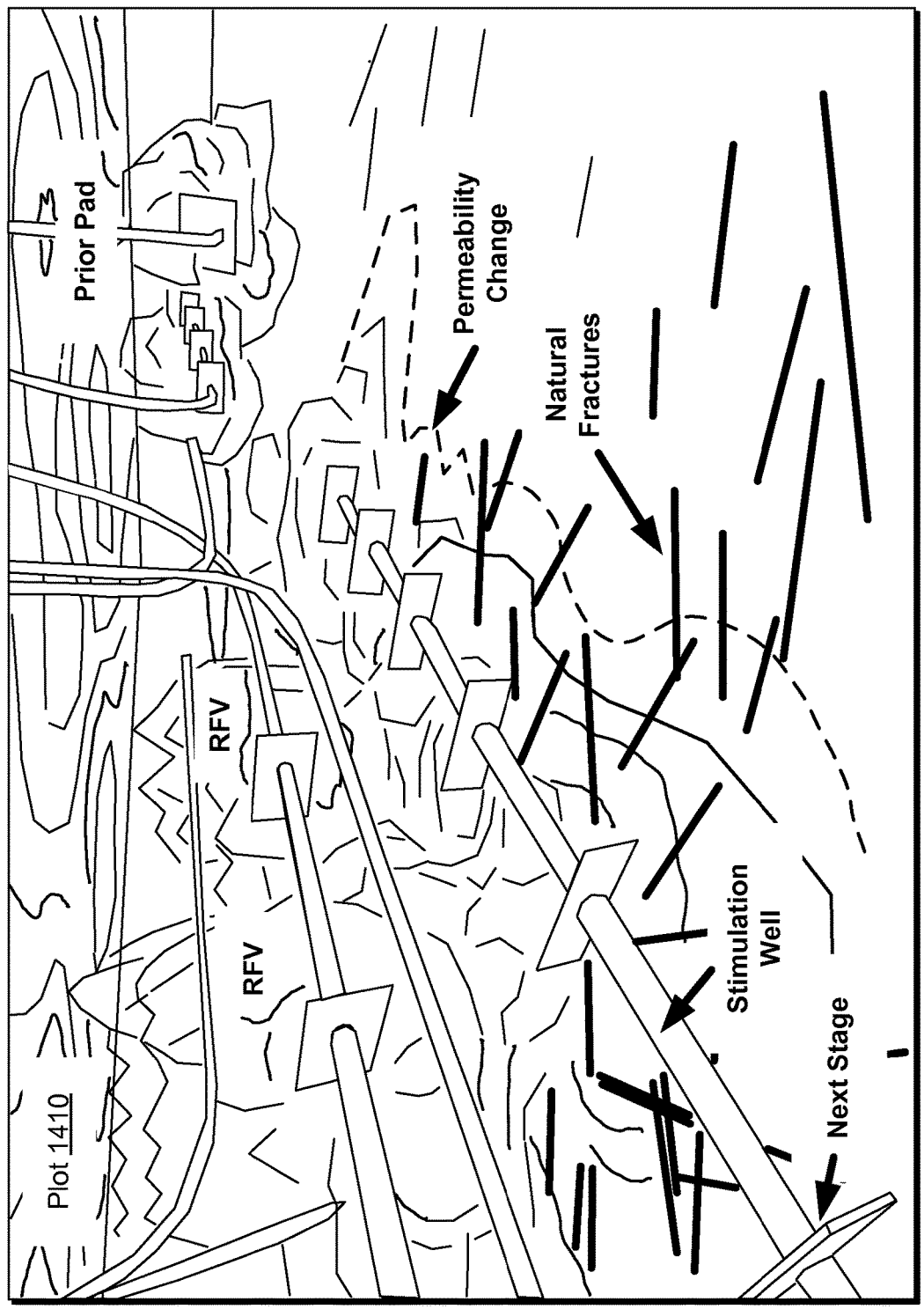
FIG. 14 illustrates an example of a plot.

FIG. 14 shows an example of a visualization of a model for modeling a geologic environment. The visualization of FIG. 14 may be a graphical user interface that can be rendered to a display of a computing system, for example, via execution of instructions by one or more processors where information may be provided as to locations of wells, microseismic events, etc. The visualization of FIG. 14 shows regions of reactivated fracture volume (RFVs) as associated with a geologic environment that has been subject to a fracturing process (e.g., a stimulation treatment or treatments such as hydraulic fracturing), a stimulation well, a prior pad with wells and associated RFVs, a "next stage" representation of a fracture that may be planned for creation in a stage of a fracturing process applied to the geologic environment represented by the visualization and a region of permeability change (see, e.g., dashed line). Also shown in FIG. 14 are thick lines that represent geometry of fractures such as natural fractures (e.g., from a discrete fracture network "DFN", etc.).

Figure 15:
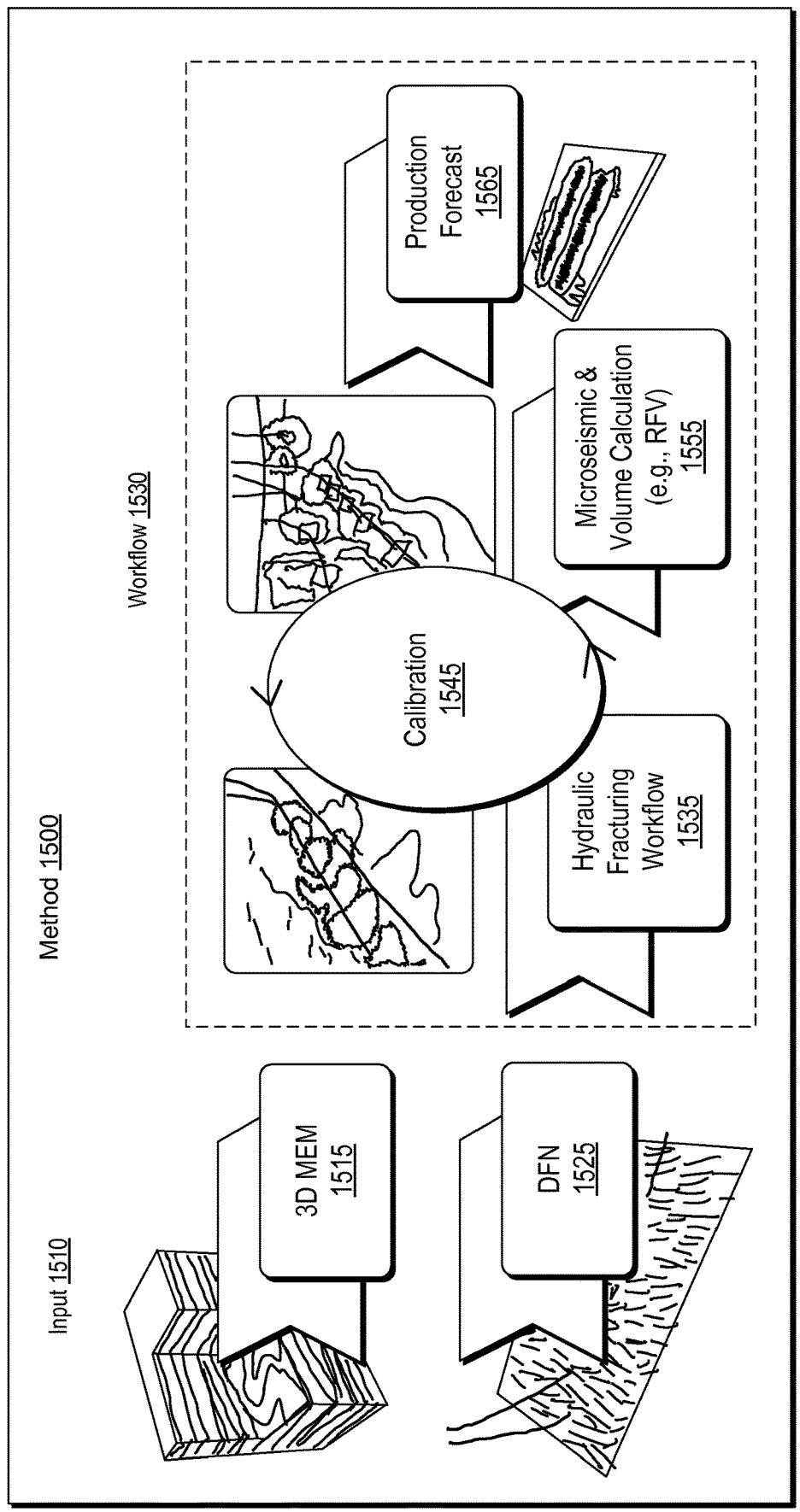
FIG. 15 illustrates an example of a workflow and input to the workflow.

FIG. 15 shows an example of a method 1500 that includes input 1510 to a workflow 1530. As shown, input 1510 can include input of a multidimensional mechanical earth model 1515 (e.g., a 3D MEM) and input of a fracture network 1525, such as, for example, a discrete fracture network (DFN).

As an example, the workflow 1530 can include a hydraulic fracturing workflow block 1535, a calibration block 1545, a microseismic and volume calculation block 1555 and a production forecast block 1565. As shown, the calibration block 1545 may calibrate information of the blocks 1535 and 1555. As an example, information output from at least from volume calculations (e.g., per the block 1555) may be input to the production forecast block 1565 to compute at least one production forecast (e.g., based at least in part on one or more reactivated fracture volumes).

As an example, a workflow may include one or more of the following: a definition block that can define, for a concept of Total Reactivated Fractured Volume (Total RFV), a method of calculation based on one or more elasto-plastic solutions for opening/shearing of fractures under given stress conditions where such an approach may establish a link between dynamic stress changes, microseismic activity, effective changes in fracture aperture, and permeability; a modeling block that can provide for stress/strain modeling at individual stages of stimulation, for example, beyond a near-fracture or near-well environment, that can address and quantify stress shadow effects, potential fault reactivation and well interference/stability changes, etc.; a prediction block that may provide for predicting synthetic microseismicity, which can be directly compared with field data for the purposes of calibration; a scenario block for providing capabilities to treat multi-well and multi-pad scenarios; and a calculation block to calculate local permeability enhancements from the RFV, at the local and/or global scale, at one or more individual stages.

Referring to FIG. 15, as an example, the hydraulic fracturing workflow block 1535 can be associated with a process of hydro-fracturing that itself accounts for the opening of the hydraulic fracture against the surrounding rock, due to an increase in pressure, and for the action of the proppant material to partially prevent the fracture from closing. Such a workflow can include calculating displacements of intact material and discontinuities, and tensors of stress and elasto-plastic deformation throughout a pad (e.g., particular region under consideration). Hydraulic fracturing modeling may provide for elasto-plastic solutions that can be obtained for opening and/or closing stages of a hydraulic fracture.

Referring to FIG. 15, as an example, microseismicity aspects of the block 1555 may include evaluating changes in plastic strain in cells crossed by a DFN (e.g., per the block 1525) at individual points in time where such changes may be processed to predict microseismicty. For example, a plastic strain tensor may be projected on discontinuity planes before opening a hydraulic fracture to obtain a reference value for cumulated plastic strain during initialization and/or for plastic strain that could be related to the history of the material; then, the plastic strain tensor may be projected again on the discontinuity planes but during the opening and closing of the hydraulic fractures. In such an example, one or more increases in the projected shear plastic strain, with respect to the referential value, on a fracture may be interpreted as a microseismic event. As an example, magnitude of an individual microseismic event may also be computed from the strain tensor and the stiffness matrix, which in turn depends on the mechanical properties of the fractured rock. As computed, synthetic microseismicty can serve as a link to calibrate the model by comparison with field observations (e.g., field data).

Referring to FIG. 15, as to reactivated fracture volume (RFV or, e.g., IFV), once a model is calibrated against field microseismic data from the field (e.g., per the calibration block 1545). As an example, the plastic strain tensor (e.g., used to compute microseismicity) may be decomposed into the normal and shear components on the discontinuity planes. In such an example, change in the normal component can then be assumed to be proportional to aperture changes of the discontinuities. In such an example, the associated increase in the volume may then be integrated within the volume studied to obtain RFV (e.g., total RFV). As an example isosurfaces of RFV values can be generated to depict the extent of the obtained RFV, (see e.g. the RFVs of FIG. 14). As an example, information may be rendered to a display, etc. where such information pertains to fracture volume (e.g., RFV, IFV, etc.).

As an example, where deformations are greater, the magnitude of seismic events and the local permeability changes are also greater. From this point, predicting local permeability changes may be performed by up-scaling the fracture network with the updated apertures to the reservoir simulation grid. As mentioned, calculated local permeabilities may be further exploited if input as information into a reservoir simulator (e.g., consider the ECLIPSE™ simulator), which may be executed using a computing system to predict production.

As an example, one or more graphical user interfaces (GUIs) may be based at least in part on instructions stored in memory of a computing system and executable by one or more processors to render such illustrations to a display (e.g., local and/or remote displays). As an example, one or more RFVs may be mapped into a geomechanical grid together with the computed permeability changes. As may be appreciated, the stress shadow region and one or more permeability changes may be examined via visualization, processing of data, etc. Such information may aid in prediction or forecasting production. For example, where permeability changes are estimated by a workflow, such information may be input to a reservoir simulator that can simulate production. Output from a reservoir simulator may show that flow occurs from higher permeability regions as fractured (e.g., new and/or activated fractures) and then decreases as those regions are depleted (e.g., pressure drop, etc.) where flow from the lower permeability regions may be limited.

As an example, a workflow may include simulating fractures. As an example, consider simulating complex fractures in shale reservoirs. As mentioned, fractures may be generated artificially, for example, via hydraulic fracturing. Hydraulic fracturing may be considered a stimulation treatment that may aim to enhance recovery of one or more resources from a reservoir or reservoirs.

As an example, a simulation framework may include one or more modules that can model stimulation of a geologic environment, for example, to generate one or more fractures. For example, consider the commercially available MANGROVE™ engineered stimulation design package that may be operated in conjunction with a framework such as, for example, the PETREL™ framework (e.g., optionally in the OCEAN™ framework). The MANGROVE™ package may be operated as a hydraulic fracturing simulator and may be, for example, integrated into one or more seismic-to-simulation workflows (e.g., for conventional and/or unconventional reservoirs). As an example, the MANGROVE™ package may be implemented to grid and model complex fractures, which may be used for reservoir simulation.

As an example, stimulation design functionality may be implemented to predict realistic fracture scenarios. For example, consider functionality that can provide for simulation of nonplanar hydraulic fractures using an unconventional fracture model (UFM) and/or wiremesh model. As an example, a UFM may be implemented as to natural fractures (e.g., a naturally fractured reservoir).

Stimulation design may integrate one or more of geological and geophysical (G&G), petrophysical, geomechanical, and microseismic data. Stimulation modeling may help to increase productivity and, for example, reduce use of fracturing materials (e.g., fluid, proppant, etc.).

As an example, a stimulation design package may be implemented as a part of a workflow that aims to optimize well completion designs. As a poorly completed well is not likely to produce at maximum potential, an engineered process based on reservoir characterization may provide better completion designs. Whether input is G&G data via 3D models, well logs, offset wells, or pilot wells, completion and stimulation designs may be customizable to increase ROI by producing the reservoir more effectively.

A stimulation design workflow may provide estimates of proppant placement, fracture network dimensions, and reservoir penetration based on properties such as rheology, leakoff pressure, friction performance, permeability, and closure stress.

As an example, a feedback loop may be implemented to compare simulations to actual results. For example, real-time data, such as that acquired by a hydraulic fracture mapping service (e.g., consider StimMAP as a stimulation mapping service) may be analyzed and compared to simulated results (e.g., to help to optimize treatments as they are being performed). Such comparisons may help improve well planning and reduce operational risks.

As an example, a method may include extracting from a Total Reactivated Fracture Volume (e.g., total RFV), a sub-volume reactivated that is, for example, connected to a stimulation well. Such a sub-volume may be part of a Total Interconnected Fractured Volume (e.g., total IFV).

As an example, a method can include receiving mechanical information of a geologic environment and location information of natural fractures of the geologic environment; using a model of the geologic environment, calculating at least strain associated with hydraulic fracturing in the geologic environment; calculating at least microseismicity event locations based at least in part on the calculated strain; calibrating the model based at least in part on the calculated microseismicity event locations and based at least in part on measured microseismicity information associated with the geologic environment to provide a calibrated model; and, using the calibrated model, determining an increase in reactivated fracture volume associated with hydraulic fracturing in the geologic environment. Such a method may include forecasting production of the geologic environment based at least in part on the reactivated fracture volume.

As an example, a method can include receiving mechanical information of a geologic environment and location information of natural fractures of the geologic environment; using a model of the geologic environment, calculating at least strain associated with hydraulic fracturing in the geologic environment; calculating at least microseismicity event locations based at least in part on the calculated strain; calibrating the model based at least in part on the calculated microseismicity event locations and measured microseismicity information associated with the hydraulic fracturing in the geologic environment to provide a calibrated model; and, using the calibrated model, determining an increase in reactivated fracture volume associated with the hydraulic fracturing in the geologic environment. Such a method may include forecasting production of the geologic environment based at least in part on the reactivated fracture volume.

As an example, mechanical information may be of a multidimensional mechanical earth model. As an example, location information of natural fractures may be of a discrete fracture network (DFN). In such an example, a method can include calculating microseismicity based at least in part on elasto-plastic deformation in cells of a model as crossed by the DFN. As an example, a method can include calculating microseismicity event locations and event magnitudes. As an example, measured microseismicity information may include event locations, event magnitudes, event locations and magnitudes, etc.

As an example, a method can include determining an increase in reactivated fracture volume by decomposing a plastic strain tensor into normal and shear components on discontinuity planes. Such an example may include, based at least in part on normal components of the plastic strain tensor on discontinuity planes, calculating aperture changes for discontinuities.

As an example, a method can include calculating values of a plastic strain tensor. Such an example may include calculating microseismicity event location by projecting the values of the plastic strain tensor on discontinuity planes of a model before hydraulic fracturing to obtain a reference value for cumulated plastic strain during initialization and/or for plastic strain related to history of material of the geologic environment. As an example, such a method can include projecting the plastic strain tensor on the discontinuity planes during at least opening of one or more hydraulic fractures of the hydraulic fracturing. In such a method, an increase in the projected shear plastic strain, with respect to the referential value, on a fracture may be interpreted as a microseismic event. As an example, magnitude of a microseismic event may be computed from a plastic strain tensor and a stiffness matrix as dependent on mechanical properties of fractured material in a geologic environment.

As an example, a system can include a processor; memory operatively coupled to the processor; and one or more modules that include processor-executable instructions stored in the memory to instruct the system to receive mechanical information of a geologic environment and location information of natural fractures of the geologic environment; use a model of the geologic environment to calculate at least strain associated with hydraulic fracturing in the geologic environment; calculate at least microseismicity event locations based at least in part on the calculated strain; calibrate the model based at least in part on the calculated microseismicity event locations and based at least in part on measured microseismicity information associated with the geologic environment to provide a calibrated model; and use the calibrated model to determine an increase in reactivated fracture volume associated with hydraulic fracturing in the geologic environment. As an example, a system can include instructions to instruct the system to forecast production of the geologic environment based at least in part on the reactivated fracture volume. As an example, a system can include instructions to calculate at least microseismicity event locations and instructions to calculate event magnitudes.

As an example, one or more computer-readable storage media can include computer-executable instructions to instruct a computer to: receive mechanical information of a geologic environment and location information of natural fractures of the geologic environment; use a model of the geologic environment to calculate at least strain associated with hydraulic fracturing in the geologic environment; calculate at least microseismicity event locations based at least in part on the calculated strain; calibrate the model based at least in part on the calculated microseismicity event locations and based at least in part on measured microseismicity information associated with the geologic environment to provide a calibrated model; and use the calibrated model to determine an increase in reactivated fracture volume associated with hydraulic fracturing in the geologic environment. As an example, one or more computer-readable media may include instructions to instruct a computer to forecast production of the geologic environment based at least in part on the reactivated fracture volume. As an example, instructions to calculate at least microseismicity event locations can include instructions to calculate event magnitudes.

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2.

Figure 16:
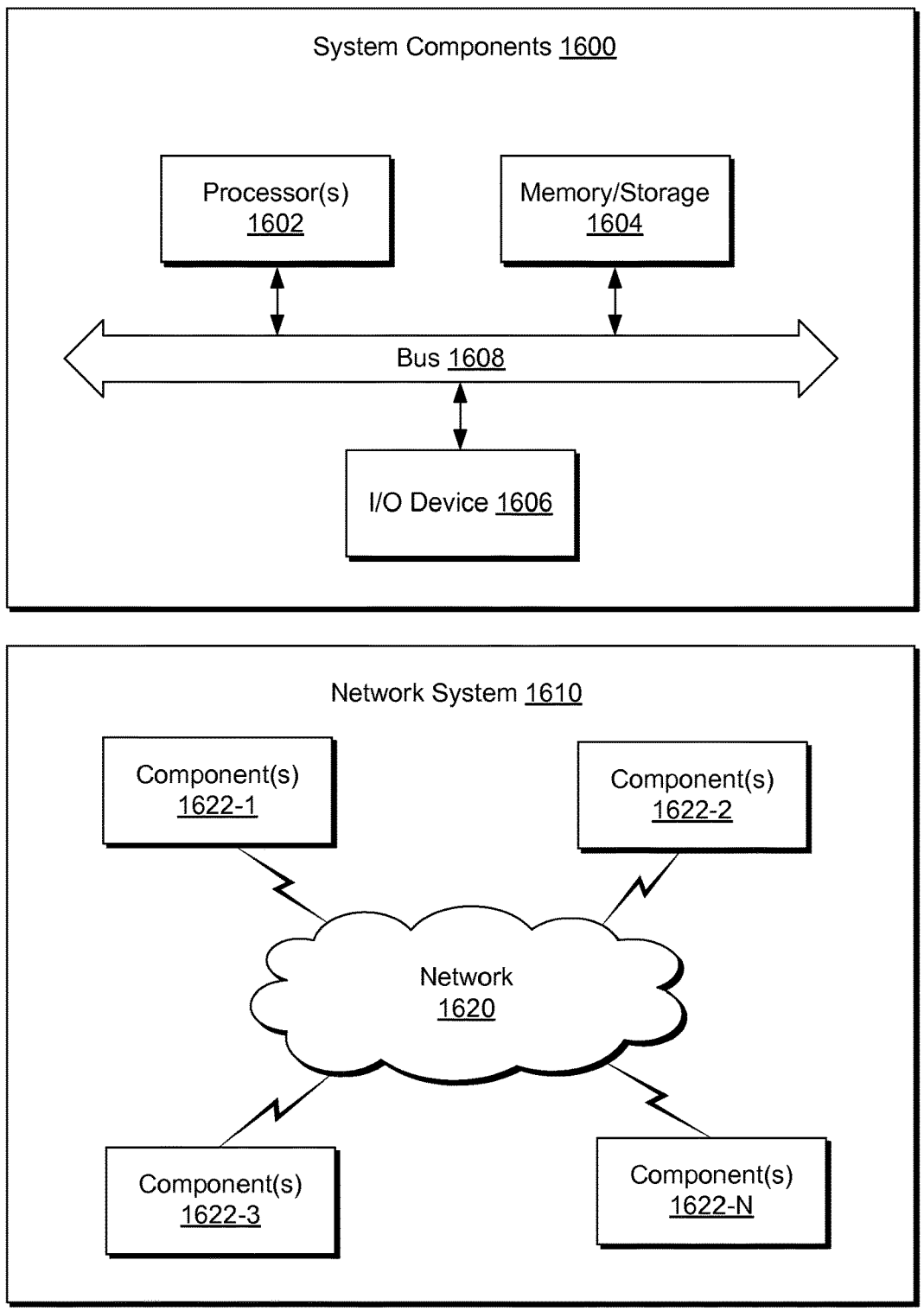
FIG. 16 illustrates example components of a system and a networked system.

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH™, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving mechanical information of a geologic environment and location information of natural fractures of the geologic environment wherein the location information of the natural fractures comprises location information of a discrete fracture network;
   using a computational model of the geologic environment, calculating at least strain associated with hydraulic fracturing in the geologic environment;
   calculating at least microseismicity event locations using the calculated strain wherein the calculating at least microseismicity event locations comprises calculating microseismicity event locations based at least in part on elasto-plastic deformation in cells of the computational model as crossed by discrete fractures of the discrete fracture network;
   after the calculating, calibrating the computational model based at least in part on the calculated microseismicity event locations and based at least in part on measured microseismicity information associated with the geologic environment to provide a calibrated computational model, wherein the measured microseismicity information is acquired via one or more sensors during hydraulic fracturing;
   after the calibrating, using the calibrated computational model, determining an increase in reactivated fracture volume associated with the hydraulic fracturing in the geologic environment, wherein the reactivated fracture volume comprises and exceeds an interconnected fracture volume;
   modeling a subsequent stage of hydraulic fracturing using the calibrated computational model to generate results; and
   based at least in part on the results, instructing equipment to perform the subsequent stage of hydraulic fracturing to further increase the reactivated fracture volume in the geologic environment.

2. The method of claim 1 further comprising forecasting production of the geologic environment based at least in part on the reactivated fracture volume.

3. The method of claim 1 wherein the calculating at least microseismicity event locations comprises calculating event magnitudes.

4. The method of claim 1 wherein the mechanical information comprises mechanical information of a multidimensional mechanical earth model.

5. The method of claim 1 wherein the determining an increase in reactivated fracture volume comprises decomposing a plastic strain tensor into normal and shear components on discontinuity planes.

6. The method of claim 5 further comprising, based at least in part on normal components of the plastic strain tensor on discontinuity planes, calculating aperture changes for discontinuities.

7. The method of claim 1 wherein the calculating at least strain comprises calculating values of a plastic strain tensor.

8. The method of claim 7 wherein the calculating at least microseismicity event locations comprises projecting the values of the plastic strain tensor on discontinuity planes of the model before the hydraulic fracturing to obtain a reference value for cumulated plastic strain during initialization and/or for plastic strain related to history of material of the geologic environment.

9. The method of claim 8 comprising projecting the plastic strain tensor on the discontinuity planes during at least opening of one or more hydraulic fractures of the hydraulic fracturing.

10. The method of claim 9 wherein an increase in the projected shear plastic strain, with respect to the referential value, on a fracture is interpreted as a microseismic event.

11. The method of claim 10 wherein magnitude of a microseismic event is computed from the plastic strain tensor and a stiffness matrix as dependent on mechanical properties of fractured material in the geologic environment.

12. A system comprising:
a processor;
memory operatively coupled to the processor; and
one or more modules that comprise processor-executable instructions stored in the memory to instruct the system to
receive mechanical information of a geologic environment and location information of natural fractures of the geologic environment wherein the location information of the natural fractures comprises location information of a discrete fracture network;
use a computational model of the geologic environment to calculate at least strain associated with hydraulic fracturing in the geologic environment;
calculate at least microseismicity event locations using the calculated strain wherein to calculate at least microseismicity event locations comprises calculation of microseismicity event locations based at least in part on elasto-plastic deformation in cells of the computational model as crossed by discrete fractures of the discrete fracture network;
after calculation of the at least microseismicity event locations, calibrate the computational model based at least in part on the calculated microseismicity event locations and based at least in part on measured microseismicity information associated with the geologic environment to provide a calibrated computational model, wherein the measured microseismicity information is acquired via one or more sensors during hydraulic fracturing;
after calibration of the computational model, use the calibrated computational model to determine an increase in reactivated fracture volume associated with the hydraulic fracturing in the geologic environment, wherein the reactivated fracture volume comprises and exceeds an interconnected fracture volume;
model a subsequent stage of hydraulic fracturing using the calibrated computational model to generate results; and
based at least in part on the results, instruct equipment to perform the subsequent stage of hydraulic fracturing to further increase the reactivated fracture volume in the geologic environment.

13. The system of claim 12 further comprising instructions to instruct the system to forecast production of the geologic environment based at least in part on the reactivated fracture volume.

14. The system of claim 12 wherein the instructions to calculate at least microseismicity event locations comprise instructions to calculate event magnitudes.

15. One or more non-transitory computer-readable storage media comprising computer-executable instructions to instruct a computer to:
receive mechanical information of a geologic environment and location information of natural fractures of the geologic environment wherein the location information of the natural fractures comprises location information of a discrete fracture network;
use a computational model of the geologic environment to calculate at least strain associated with hydraulic fracturing in the geologic environment;
calculate at least microseismicity event locations using the calculated strain wherein to calculate at least microseismicity event locations comprises calculation of microseismicity event locations based at least in part on elasto-plastic deformation in cells of the computational model as crossed by discrete fractures of the discrete fracture network;
after calculation of the at least microseismicity event locations, calibrate the computational model based at least in part on the calculated microseismicity event locations and based at least in part on measured microseismicity information associated with the geologic environment to provide a calibrated computational model, wherein the measured microseismicity information is acquired via one or more sensors during hydraulic fracturing;
after calibration of the computational model, use the calibrated computational model to determine an increase in reactivated fracture volume associated with the hydraulic fracturing in the geologic environment, wherein the reactivated fracture volume comprises and exceeds an interconnected fracture volume;
model a subsequent stage of hydraulic fracturing using the calibrated computational model to generate results; and
based at least in part on the results, instruct equipment to perform the subsequent stage of hydraulic fracturing to further increase the reactivated fracture volume in the geologic environment.

16. The one or more non-transitory computer-readable media of claim 15 further comprising instructions to forecast production of the geologic environment based at least in part on the reactivated fracture volume.

17. The one or more non-transitory computer-readable media of claim 15 wherein the instructions to calculate at least microseismicity event locations comprise instructions to calculate event magnitudes.

* * * * *